(12) United States Patent
Kirkwood et al.

(10) Patent No.: US 6,983,288 B1
(45) Date of Patent: Jan. 3, 2006

(54) MULTIPLE LAYER INFORMATION OBJECT REPOSITORY

(75) Inventors: Michael J. Kirkwood, San Francisco, CA (US); Sima Yazdani, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 543 days.

(21) Appl. No.: 09/925,204

(22) Filed: Aug. 8, 2001

Related U.S. Application Data

(60) Provisional application No. 60/252,378, filed on Nov. 20, 2000.

(51) Int. Cl.
*G06F 17/30* (2006.01)

(52) U.S. Cl. .......................... 707/103 R; 707/2; 707/3; 707/101; 707/104.1; 707/203

(58) Field of Classification Search .................. 705/10, 705/14, 27, 51, 52, 54, 57, 58, 80; 707/2, 707/3, 5, 6, 101, 103 R, 104.1, 203, 513; 709/202, 203, 205, 223; 711/108, 120, 207; 715/513
See application file for complete search history.

(56) References Cited

U.S. PATENT DOCUMENTS

| | | | |
|---|---|---|---|
| 5,283,894 A | 2/1994 | Deran | |
| 5,386,556 A | 1/1995 | Hedin et al. | |
| 5,404,506 A | 4/1995 | Fujisawa et al. | |
| 5,584,024 A | 12/1996 | Shwartz | |

(Continued)

OTHER PUBLICATIONS

Jon Anthony, "Ariadne White Paper: I–Synthesizer, Core Technology Review", Mar. 30, 2001, Version 1.1, Synquiry Technologies, Ltd, pp. 1–36.

Susan Mael, "Synquiry Brings Context and Merchandising to E–Commerce Sites", The Online Reporter, Apr. 23–27, 2001, Issue No. 244, pp. 1–3.

*Primary Examiner*—Shahid Alam
*Assistant Examiner*—Fred Ehichioya
(74) *Attorney, Agent, or Firm*—Hickman Palermo Truong & Becker LLP

(57) ABSTRACT

Techniques for relating data stored in one or more storage systems for an enterprise include managing information chunks in one or more storage systems. Each chunk comprises a unit of data for storage and retrieval operations. The techniques also include managing a vocabulary database. The vocabulary database includes data structures describing atomic concepts among names in an enterprise-specific vocabulary and data structures describing relationships among the atomic concepts. Content in a document is arranged based at least in part on data in the vocabulary database. The content is based at least in part on an information object or "chunk" in the storage system. Thus, content originally unrelated and authored over time by many different persons and organizations can be related using the business vocabulary concepts and relationships in the vocabulary database.

33 Claims, 25 Drawing Sheets

U.S. PATENT DOCUMENTS

| | | |
|---|---|---|
| 5,594,837 A | 1/1997 | Noyes |
| 5,644,740 A | 7/1997 | Kiuchi |
| 5,696,916 A | 12/1997 | Yamazaki et al. |
| 5,740,425 A | 4/1998 | Povilus |
| 5,752,023 A | 5/1998 | Choucri et al. |
| 5,875,443 A | 2/1999 | Nielsen |
| 5,907,837 A | 5/1999 | Ferrel et al. |
| 5,924,090 A | 7/1999 | Krellenstein |
| 6,038,560 A | 3/2000 | Wical |
| 6,085,187 A * | 7/2000 | Carter et al. ............ 707/3 |
| 6,139,201 A | 10/2000 | Carbonell et al. |
| 6,154,213 A | 11/2000 | Rennison et al. |
| 6,230,173 B1 * | 5/2001 | Ferrel et al. ............ 715/513 |
| 6,256,627 B1 | 7/2001 | Beattie et al. |
| 6,315,572 B1 | 11/2001 | Owens et al. |
| 6,327,593 B1 | 12/2001 | Goiffon |
| 6,349,275 B1 | 2/2002 | Schumacher et al. |
| 6,438,540 B2 | 8/2002 | Nasr et al. |
| 6,453,312 B1 | 9/2002 | Goiffon et al. |
| 6,453,315 B1 | 9/2002 | Weissman et al. |
| 6,480,860 B1 | 11/2002 | Monday |
| 6,510,406 B1 | 1/2003 | Marchisio |
| 6,510,434 B1 | 1/2003 | Anderson et al. |
| 6,519,588 B1 | 2/2003 | Leschner |
| 6,539,376 B1 | 3/2003 | Sundaresan et al. |
| 6,556,982 B1 | 4/2003 | McGaffey et al. |
| 6,629,097 B1 | 9/2003 | Keith |
| 6,665,662 B1 | 12/2003 | Kirkwood et al. |
| 6,675,159 B1 | 1/2004 | Lin et al. |
| 6,735,593 B1 | 5/2004 | Williams |
| 2003/0131007 A1 | 7/2003 | Schirmer et al. |

* cited by examiner

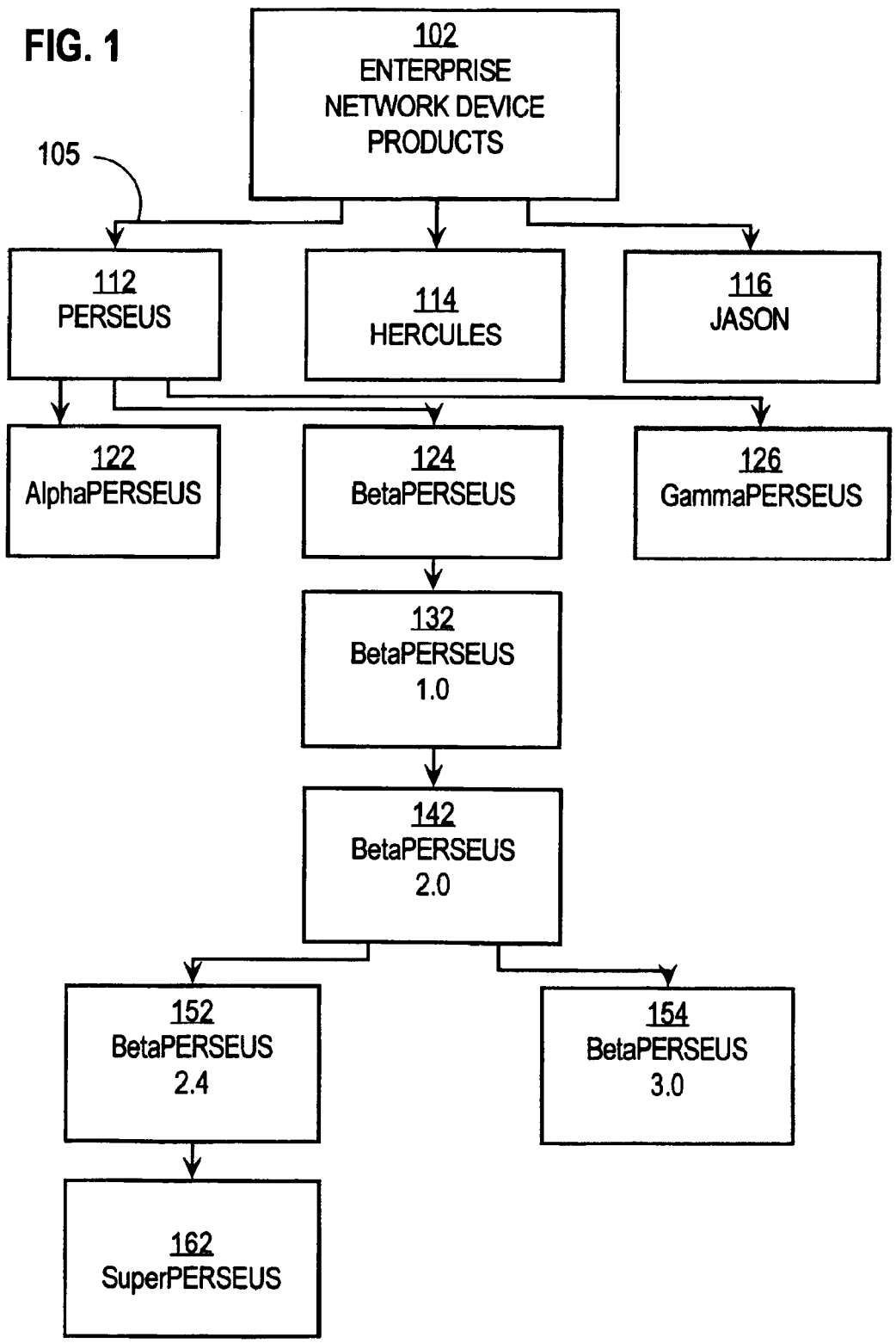

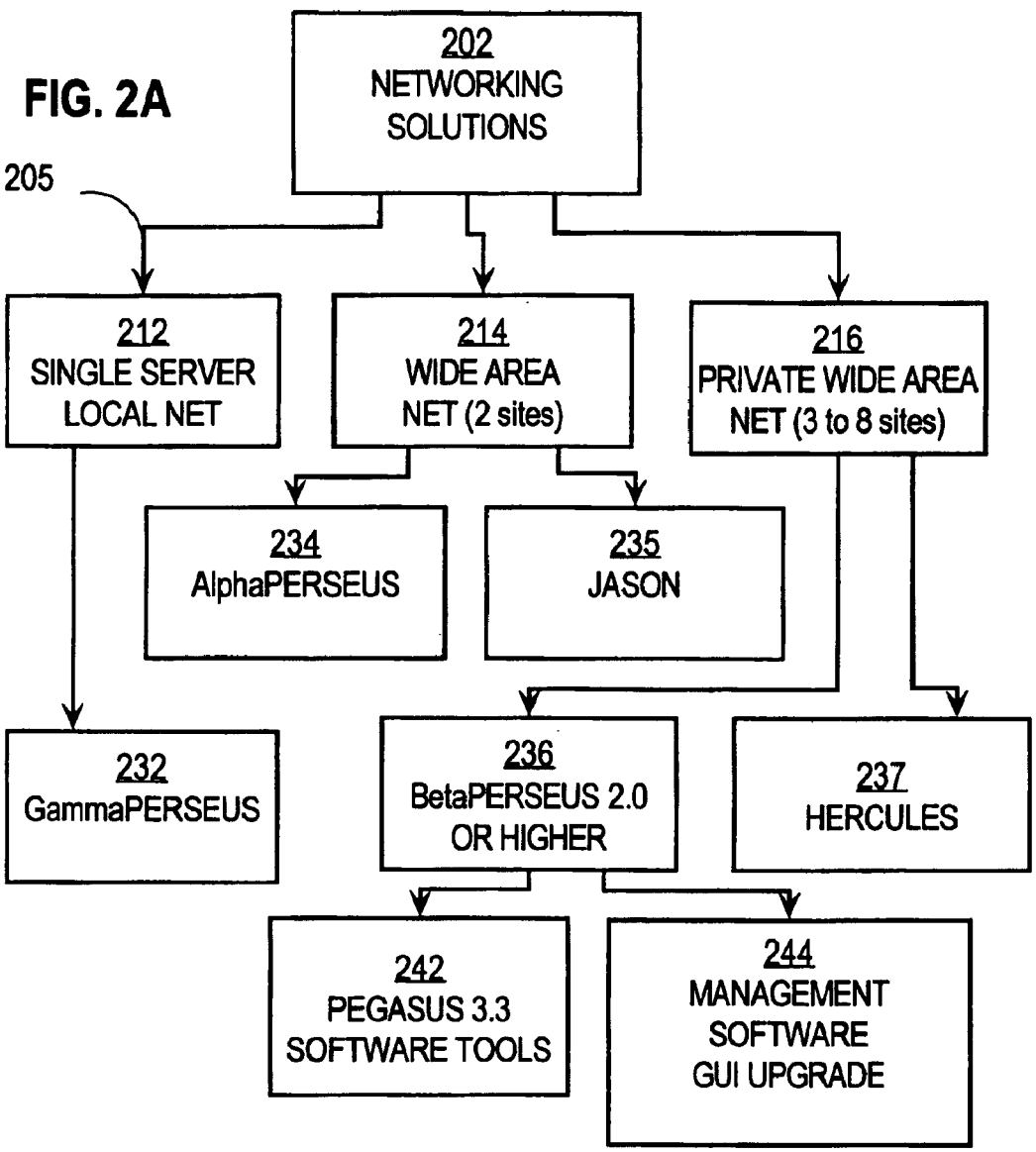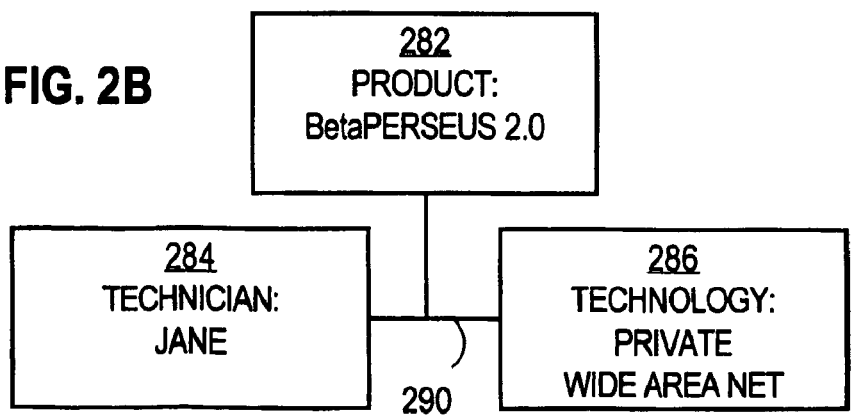

Class Hierarchy of MDF Data Structure

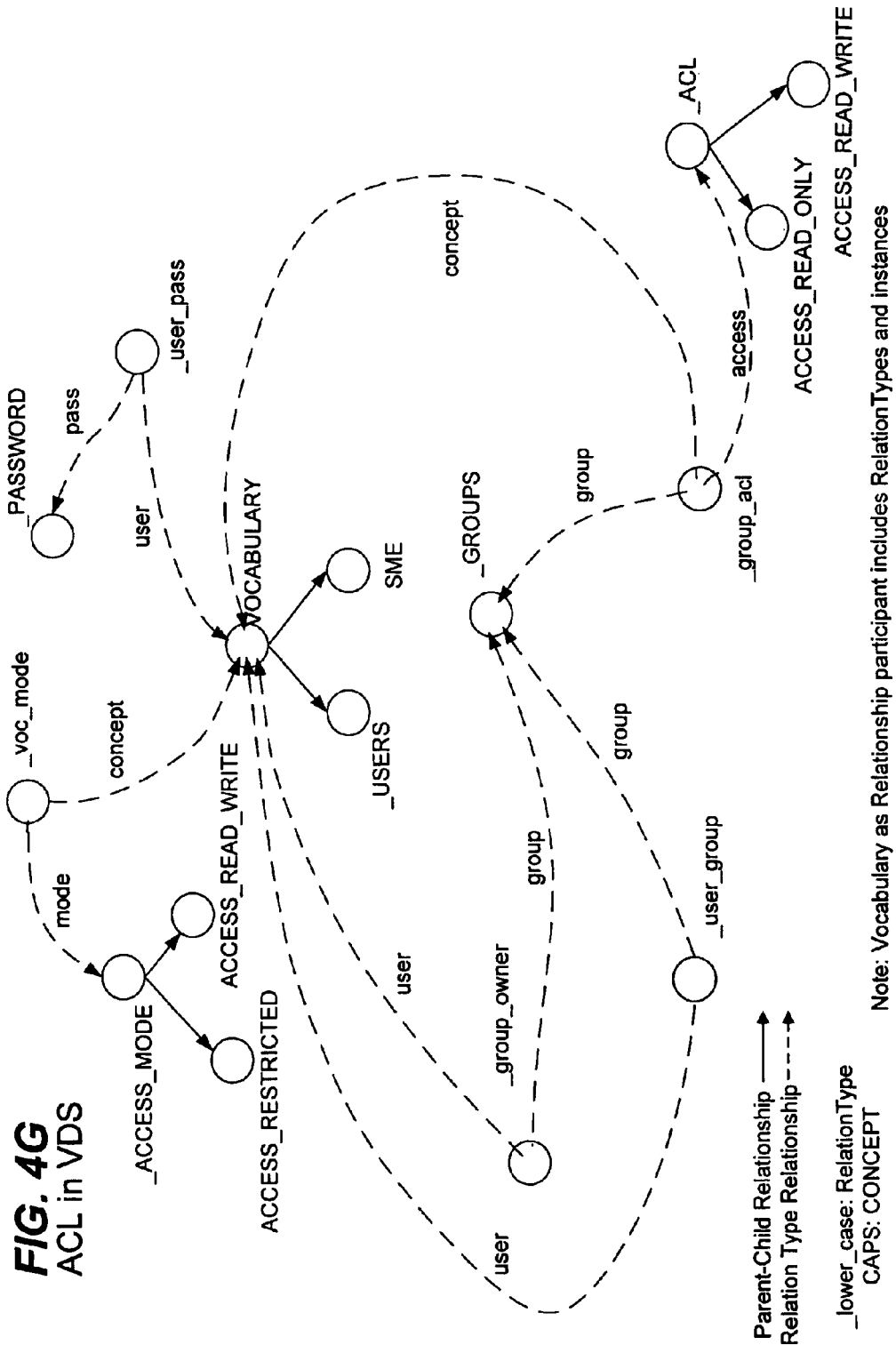

Class Hierarchy of VDS Event Mechanism

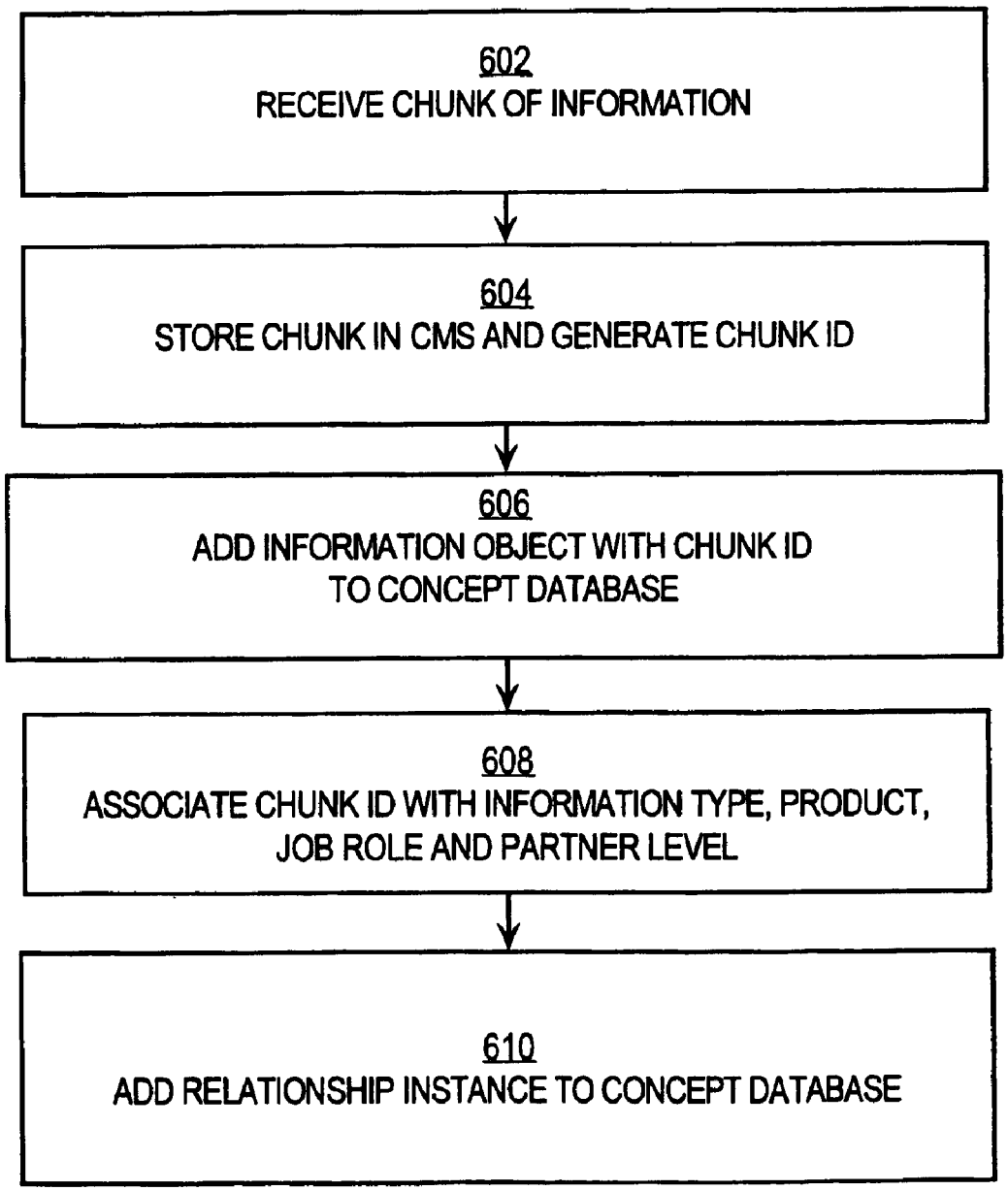

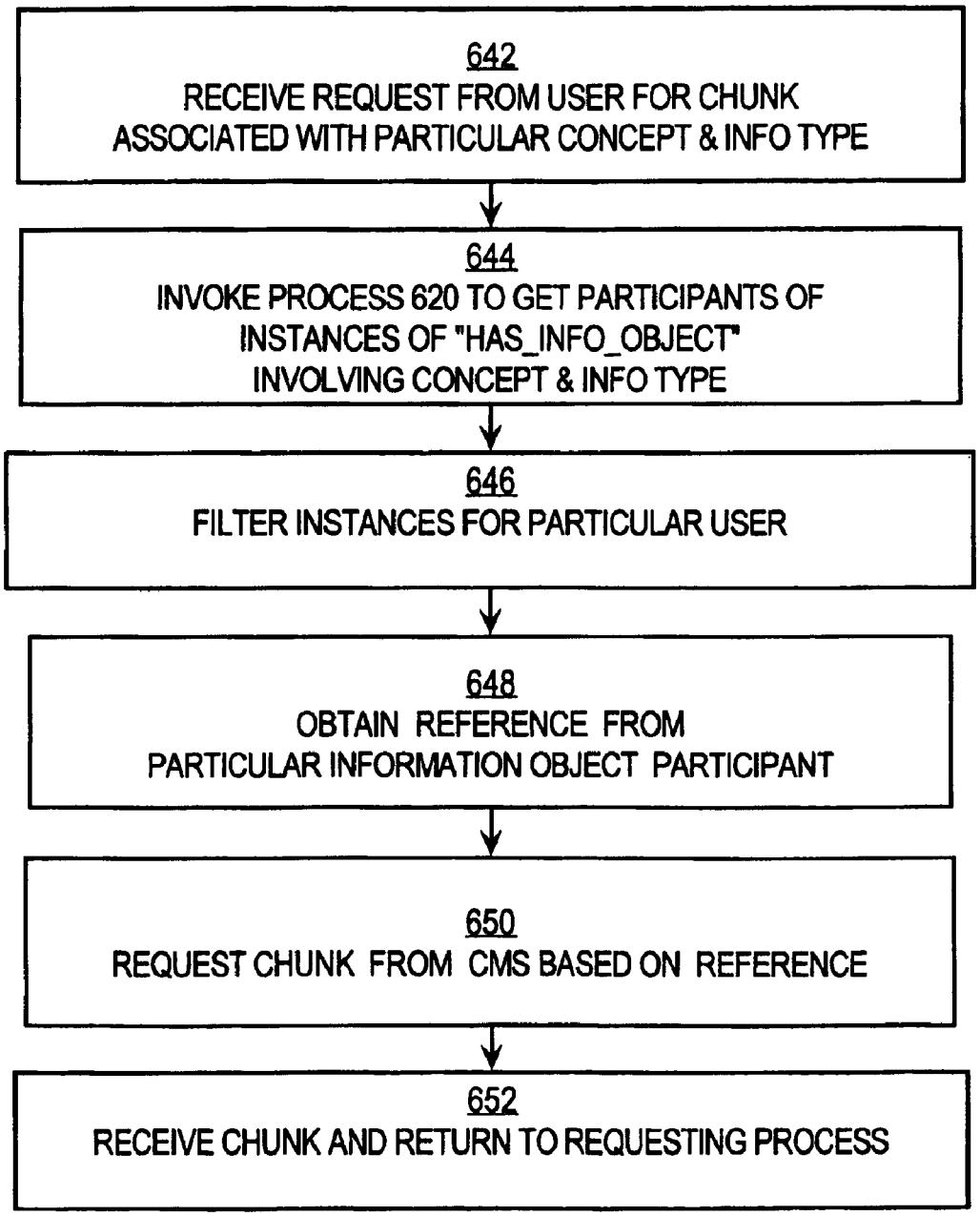

812
RECEIVE USER PROFILE AND RETURN STATIC PAGE WITH CONCEPT CATEGORIES

822
RECEIVE CONCEPT SELECTION FROM USER

824
OBTAIN URL OF INFORMATION CHUNK FOR INTRODUCTION INFO TYPE, CONCEPT & USER AND RETRIEVE INFORMATION CHUNK

826
FIND OTHER INFO TYPES INSTANCES (FOR CONCEPT AND USER)

828
FIND INSTANCES OF DOCUMENT TYPES RELATED TO OTHER INFO TYPES INSTANCES

830
GENERATE AND SEND WEB PAGE DISPLAYING CONCEPT NAME, INFORMATION CHUNK FOR INTRO TO CONCEPT, SELECTABLE LIST OF OTHER INFO TYPE INSTANCES, SELECTABLE LIST OF DOC TYPE INSTANCES, AND SELECTABLE LIST OF NEXT CONCEPTS IN HIERARCHY

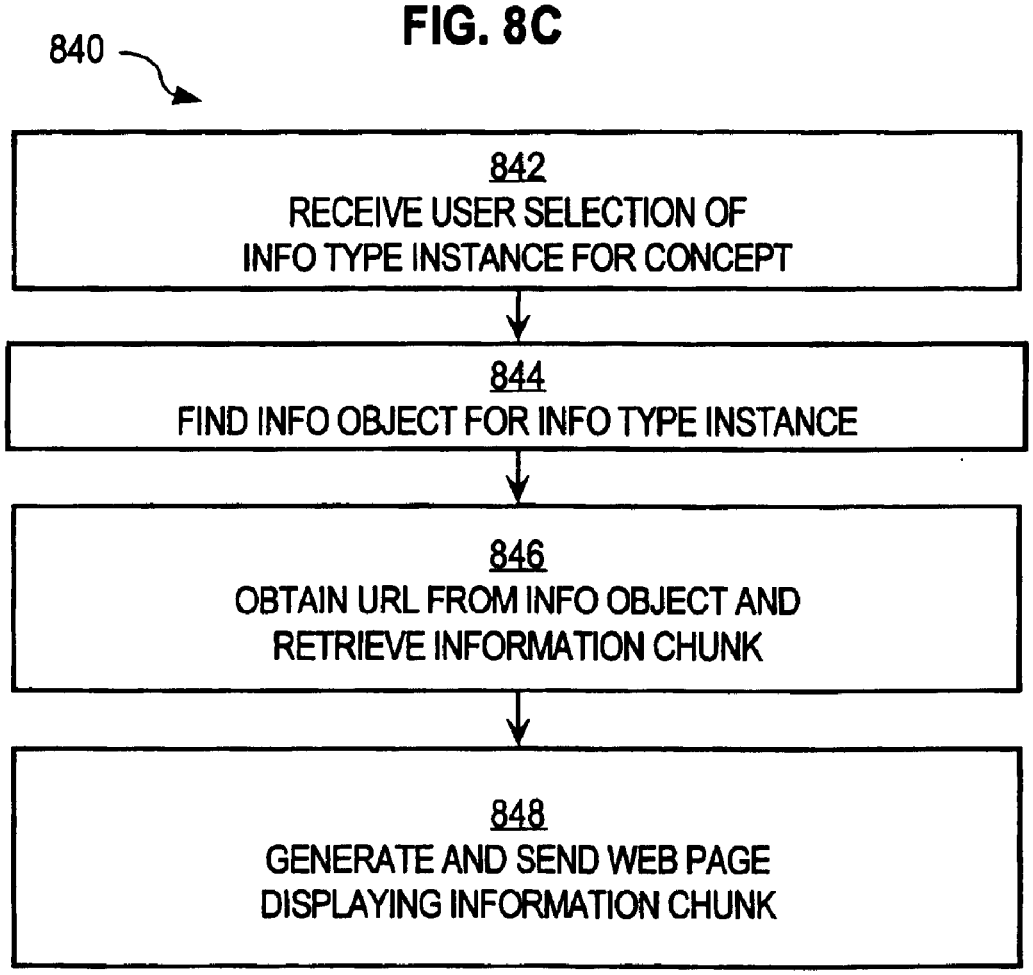

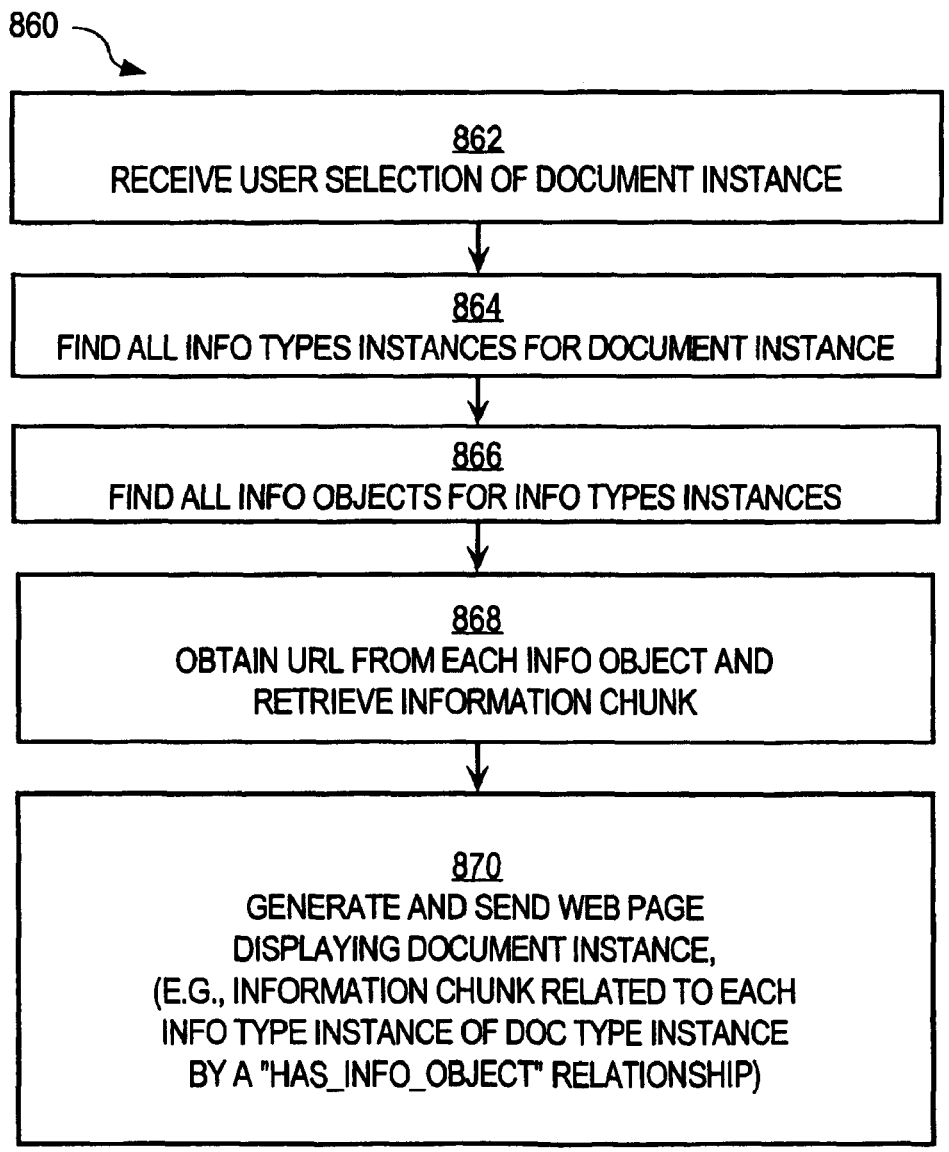

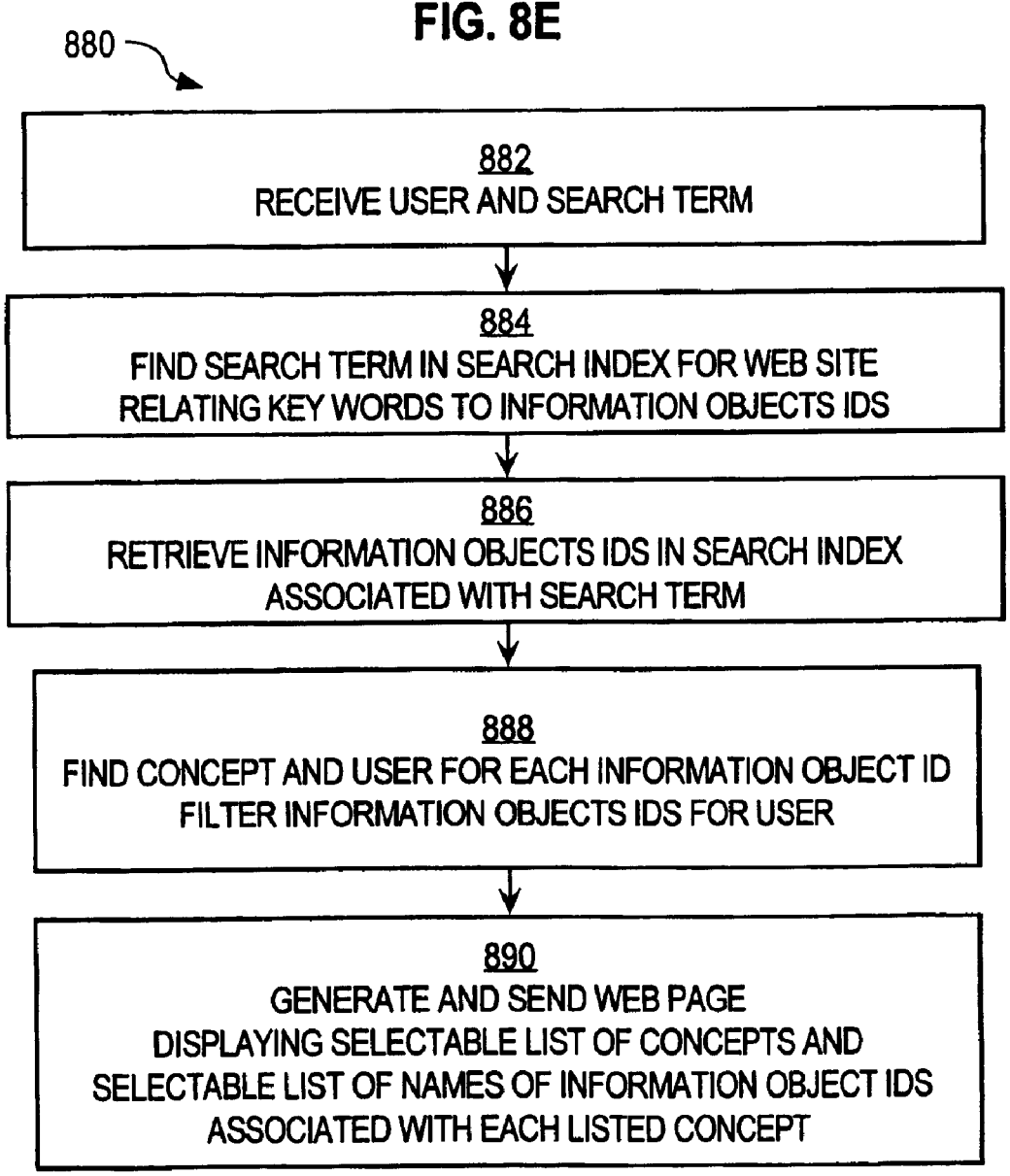

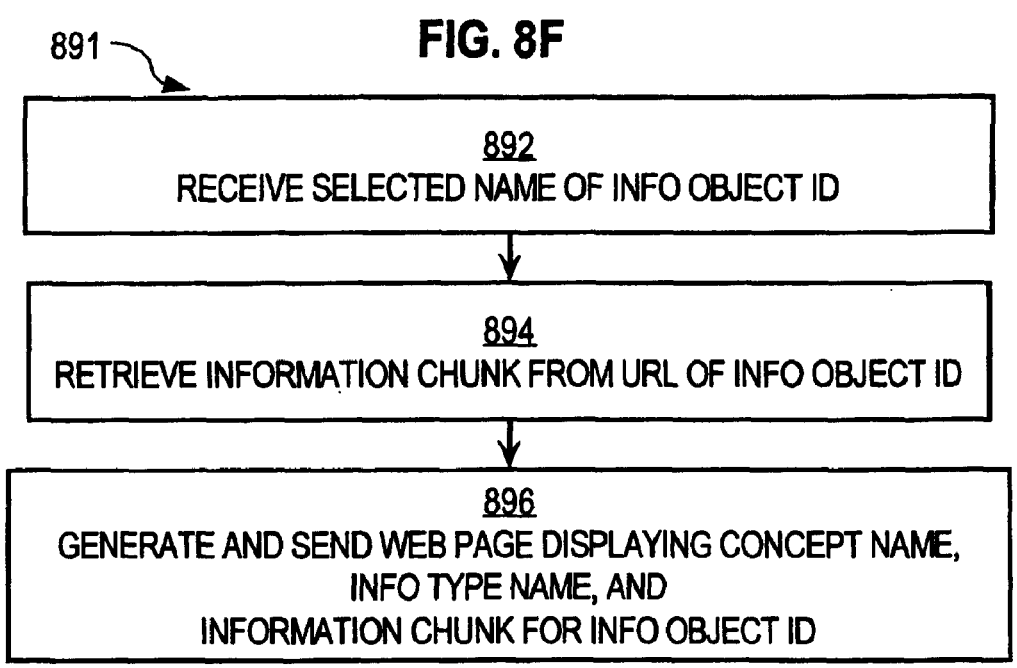

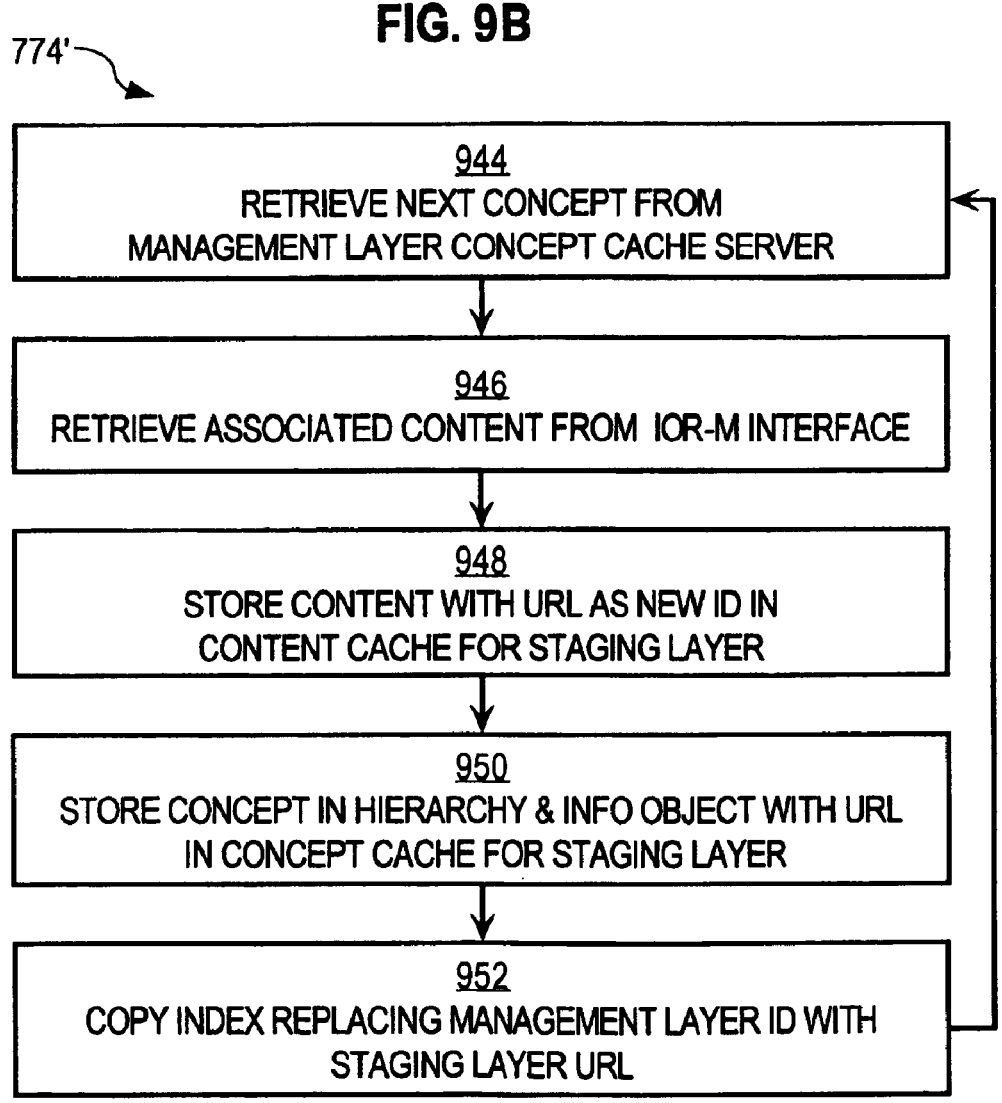

962
MODEL AND PREVIEW WEB PAGES FOR WEB SITE

964
RENDER STATIC PAGES FOR WEB SITE

966
ENSURE EVERY CHUNK HAS INFO OBJECT AND RELATIONSHIP TO ANOTHER CONCEPT

968
VIEW AND EDIT CHUNKS

970
TEST LOAD ON SERVER FOR GENERATING WEB PAGES

972
EDIT INDEX ENTRIES OF SEARCH INDEX

MULTIPLE LAYER INFORMATION OBJECT REPOSITORY

CROSS-REFERENCE TO RELATED APPLICATIONS

This application is related to and claims domestic priority from prior U.S. Provisional application Ser. No. 60/252,378, filed Nov. 20, 2000, the entire disclosure of which is hereby incorporated by reference as if fully set forth herein. This application is related to prior non-provisional applications: Ser. No. 09/823,662, filed on Mar. 30, 2001, now U.S. Pat. No. 6,665,662 B1 issued on Dec. 16, 2003, entitled "Query Translation System for Retrieving Business Vocabulary Terms" by inventors M. Kirkwood et al.; Ser. No. 09/823,819, filed on Mar. 30, 2001, entitled "Business Vocabulary Data Storage Using Multiple Inter-Related Hierarchies" by inventors M. Kirkwood et al.; Ser. No. 09/098,947, filed on Jul. 18, 2001, entitled "Business Vocabulary Data Retrieval Using Alternative Forms" by inventors M. Kirkwood et al.; Ser. No. 09/909,108, filed on Jul. 18, 2001, entitled "Techniques for Forming Electronic Documents Comprising Multiple Information Types" by inventors M. Kirkwood et al.; and Ser. No. 09/925,163, filed concurrently herewith, entitled "Dynamic Information Object Cache Approach Useful In A Vocabulary Retrieval System" by inventors M. Kirkwood et al., the entire disclosures of all of which are hereby incorporated by reference as if fully set forth herein.

FIELD OF INVENTION

The present invention generally relates to data processing in the field of electronic document creation and deployment. The invention relates more specifically to relating stored information objects using business vocabulary concepts and relationships in multiple layers increasingly tailored for producing and publishing of dynamic documents, such as Web pages for a Web site.

BACKGROUND OF THE INVENTION

Through economic growth, mergers and acquisitions, business enterprises are becoming ever larger. Further, large business enterprises in the field of high technology now offer ever larger numbers of products and services that derive from an increasingly large variety of technologies.

In this environment, managing the creation, use, protection and maintenance of the company's intellectual assets, such as products and technologies is an acute problem. As an enterprise grows, maintaining consistent usage of names of products and services throughout the enterprise becomes even more challenging. When an enterprise derives its business opportunities from research and development into new technologies or improvements of existing technologies, maintaining consistent usage of technology designations is a challenge, especially when there is disagreement or confusion about the uses, advantages or benefits of a particular technology. Such confusion can arise whether disagreements arise or not, as when there is no adequate or timely communication between different teams within an enterprise.

The World Wide Web is one communication medium that exacerbates the problem, by showing internal information to the enterprise's partners and customers. Large enterprises that own or operate complex Web sites or other network resources that contain product and technology information face a related problem. Specifically, ensuring consistent usage of product names and technology terms across a large, complicated Web site is problematic. A particular problem involves maintaining consistent use of terms when different parts or elements of the Web site applications are created or content is authored by different individuals or groups.

Based on the foregoing, there is a clear need for improved ways to manage one or more vocabularies of all company business practices and pertaining to all business terminology ("concept"), including but not limited to product names and technology terms.

In particular, there is a need for a way to logically structure and correlate stored information about those concepts so that it can be located and navigated easily regardless of who authored the information and where the information physically resides.

There is also a need for a system that can rapidly and efficiently select vocabulary concepts and related information from among a large volume of stored information that is inter-related by overlapping hierarchies, and deliver the selected information to another system for use in assembling electronic documents based on the selected information.

There is also a need for a way to deliver and replicate information distributed over one or more networks that is relevant to a user query based on the vocabulary information to individuals who are distributed among many groups of a large enterprise, or who are outside the enterprise.

There is also need for a logically oriented and related content management and deployment system that is extensible or adaptable when new business practices, products or technologies are developed by diverse, distributed groups in a large business enterprise.

SUMMARY OF THE INVENTION

The foregoing needs, and other needs and objects that will become apparent from the following description, are achieved in the present invention, which comprises, in one aspect, a method of relating data stored in one or more storage systems for an enterprise. The storage systems may comprise a database, content management system, file system, directory, etc. The method includes managing a plurality of information objects ("chunks") in one or more storage systems. Each chunk of the plurality of information chunks comprises a unit of data for storage, composition, correlation and retrieval operations. A series of vocabularies, relationships, and attributes are also managed. The vocabulary system includes data structures describing atomic concepts among names in an enterprise-specific vocabulary, and a plurality of data structures describing relationships and/or attributes among the atomic concepts. The data structures describing and relating atomic concepts include a first information object vocabulary having data indicating a first reference to a first chunk in the storage system. The data structures describing relationships include a first relationship between the first information object and a second concept of the atomic concepts.

In an embodiment of this aspect, the first chunk is one of a block of text, an application, a query for a database, a vector graphic, an image, audio data, and video data.

In another embodiment of this aspect, the first reference comprises one of a file name, a network resource address, a universal resource locator (URL) address, a record identification in a predetermined database, a record identification in a predetermined content management system, an object in a cache, a Web service, or an application.

In another embodiment of this aspect, the method includes generating and storing a first subset of the plurality of information chunks into a first content cache for managing content of an electronic document.

In another aspect, the invention comprises a method for arranging content for an electronic document. The method includes managing information chunks in a content cache. Each chunk is retrieved by a directory address. The method also includes managing data structures describing atomic concepts among names in an enterprise-specific vocabulary and data structures describing relationships among the atomic concepts in a concept cache.

Content on the electronic document is arranged based at least in part on data in the concept cache.

In another aspect, a method for relating data stored in one or more storage systems for an enterprise includes managing information chunks in one or more storage systems. Each chunk comprises a unit of data for storage, execution, and retrieval operations. The method also includes managing a vocabulary database. The vocabulary database includes data structures describing atomic concepts among names in an enterprise-specific vocabulary and data structures describing relationships among the atomic concepts. The content in a document is based at least in part on an information chunk in the content management system. The content is arranged in the document based at least in part on data in the vocabulary database; in one embodiment, all content is based on the vocabularies.

In one feature, the vocabulary database includes data structures describing atomic concepts among names in an enterprise-specific vocabulary and data structures describing relationships among the atomic concepts. A first subset of the information chunks is generated and stored into a first content cache for managing content of an electronic document. A second subset of the first content cache is generated and stored into a second content cache for staging content for the electronic document that can be replicated to one or more Web servers. The data structures describing atomic concepts include a first information object indicating a first reference to a first chunk in the storage system. The data structures describing relationships include a first relationship between the first information object and a second concept of the atomic concepts.

In other aspects, the invention encompasses computer readable media, and systems configured to carry out the foregoing steps.

In one aspect, this invention allows content originally unrelated and authored over time by many different persons and organizations to be related using the business vocabulary concepts and relationships in the vocabulary database.

In another aspect, this invention allows streamlined subsets of the information chunks in the content management systems and the concepts and relationships in the concept database of a vocabulary development server to be formed and managed, including being viewed and edited, to expedite the dynamic production of documents such as Web pages for a Web site.

According to other features, each information object has one or more n-ary relationships with atomic concepts in the concept vocabulary, giving maximum flexibility in using and composing larger objects. In addition, these relationships make possible other useful functions, such as distributed caching and storage, among other capabilities.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates a hypothetical product type hierarchy according to one embodiment FIG. 2A is a block diagram that illustrates a networking solutions hierarchy including one or more concepts from the product type hierarchy of FIG. 1 according to one embodiment;

FIG. 2B is a block diagram that illustrates a non-binary relationship among concepts according to one embodiment;

FIG. 4G is a diagram illustrating relationships among an access control list and nodes of a tree of the type shown in FIG. 4C;

FIG. 6A is a flow chart illustrating a method for managing an information object repository by generating and storing an information object according to one embodiment;

FIG. 6C is a flow chart illustrating a method for managing an information object repository by retrieving information content associated with an information object according to one embodiment;

FIG. 8A is a flow chart illustrating a method for generating a static Web page based on the Web server layer of the information object repository according to one embodiment;

FIG. 8B is a flow chart illustrating a method for generating a concept home Web page based on the Web server layer of the information object repository according to one embodiment;

FIG. 8C is a flow chart illustrating a method for generating a concept information type Web page based on the Web server layer of the information object repository according to one embodiment;

FIG. 8D is a flow chart illustrating a method for generating a concept document Web page based on the Web server layer of the information object repository according to one embodiment;

FIG. 8E is a flow chart illustrating a method for generating a concept search result Web page based on the Web server layer of the information object repository according to one embodiment;

FIG. 8F is a flow chart illustrating a method for generating an information chunk Web page based on the Web server layer of the information object repository according to one embodiment;

FIG. 9B is a flow chart illustrating a method for generating and managing a staging layer of the information object repository according to one embodiment;

FIG. 9C is a flow chart illustrating a method for preparing a Web site in a staging layer of the information object repository according to one embodiment.

DETAILED DESCRIPTION OF THE PREFERRED EMBODIMENT

Figure 3:
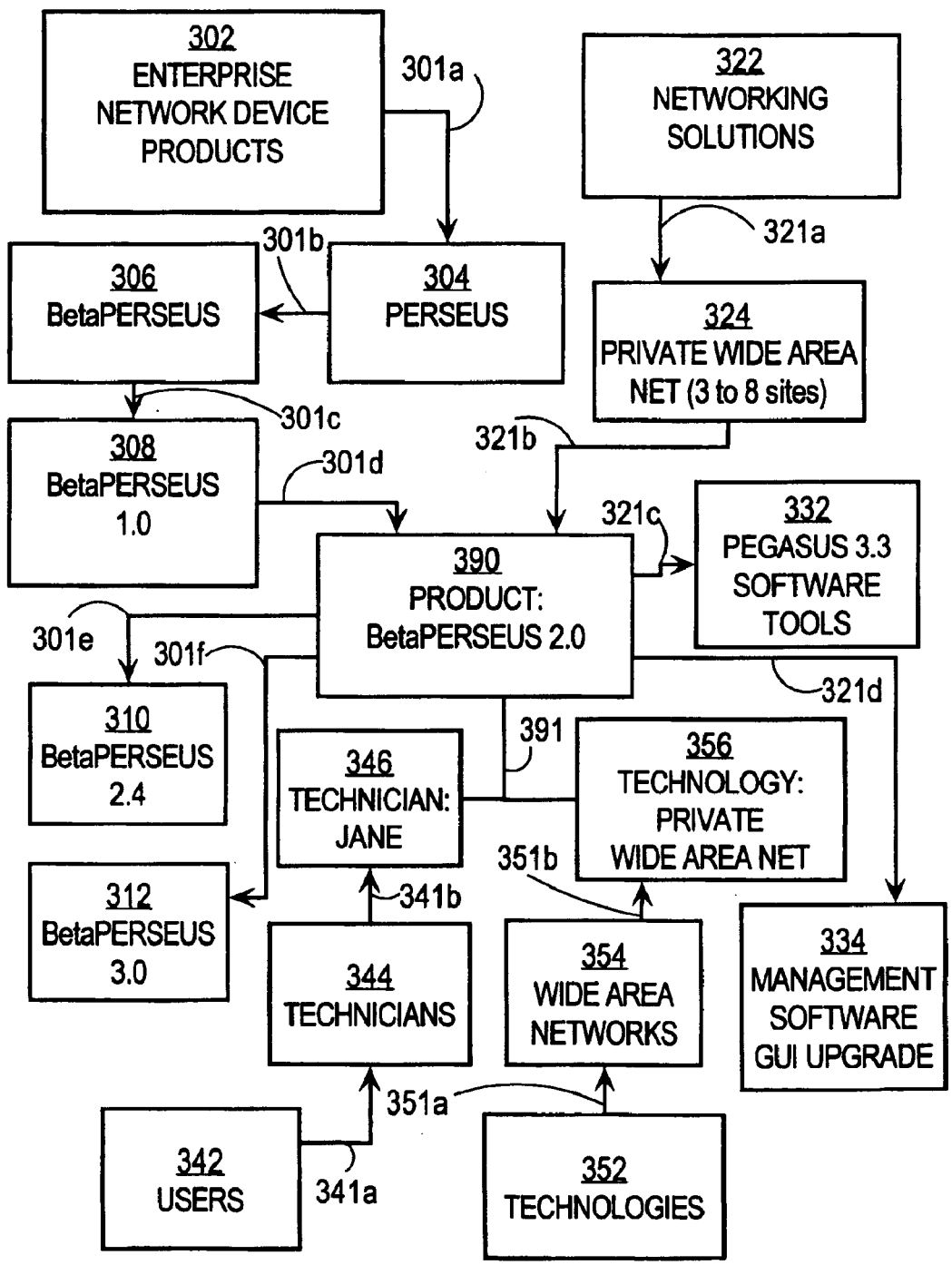
FIG. 3 is a block diagram illustrating simultaneous multiple inter-related hierarchies involving a product type concept according to one embodiment.

A method and apparatus for storing business vocabulary data using multiple inter-related hierarchies are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 Business Vocablary Data Processing

Business vocabulary terms are used to name products, product lines, technologies, people, processes, development efforts and other business activities of an enterprise. Some of the vocabulary terms are used only internally and some are used for interaction with the public to establish brand name recognition or to support precise communication of customer interests and orders. Terms related in meaning or form are used to associate related business products and activities in the minds of the users of those terms. For example, a device sold by an enterprise might be named Perseus, after a hero of Greek mythology, and a software program for executing on that device might be named Pegasus, after the winged horse Perseus rode. Similarly, different models of the Perseus device might be called AlphaPerseus and BetaPerseus, to show they are part of the same product line, while different versions of each model may be numbered, such as BetaPerseus 2.0 and BetaPerseus 2.4.

The present invention is based in part on a recognition that the business terms of an enterprise constitute an important type of business data that should be included in the automated data processing that the enterprise performs. This vocabulary data about the products, services and activities of a business is a form of metadata for the products, services and activities of the enterprise. Those terms can be used to categorize the products, services and activities and to retrieve other data about those products, services and activities. The data structures employed to store, retrieve and process this metadata should account for the associations in meaning and form and support rapid associative or inferential search and retrieval.

2.0 Vocabulary Development Framework

According to the present invention, the various terms that constitute the business vocabulary of an enterprise are modeled as nodes in a hierarchy called the MetaData Framework (MDF) or the Vocabulary Development Framework (VDF). In this framework, any business term that is derived from another particular business term is positioned in the hierarchy at a node that branches from the node of that particular business term from which it is derived. When the hierarchy is embodied in stored data with appropriate data structures and software programs, it is extremely useful in naming products and associating products with product lines.

For example, FIG. 1 shows a hypothetical product type hierarchy for a hypothetical enterprise that manufactures and sells network devices. In this hierarchy, node 102 is a root node representing network device products sold by the enterprise. Node 102 has three child nodes, 112, 114, 116 that are connected by arrows 105. The parent/child relationship is denoted by an arrow pointing from parent to child in FIG. 1. A relationship statement can be obtained reading from arrow head to arrow tail by the words "is a child of" or read in the opposite direction by the words "is a parent of." Thus node 112 is a child of node 102. Node 102 is a parent of node 112. In the product type hierarchy of FIG. 1, arrow 105 represents the product type parent/child relationship.

Node 112 represents the devices named "Perseus." In this embodiment, the name of node 112 includes "Perseus." Nodes 114, 116 represent devices named "Hercules" and "Jason," respectively. FIG. 1 shows that the Perseus device comes in three models, "AlphaPerseus," "BetaPerseus" and "GammaPerseus," represented by the three nodes 122, 124, 126, respectively. The BetaPerseus model has evolved over time through versions 1.0, 2.0 and 3.0, represented by nodes 132, 142, 154, respectively. The names of these nodes are "BetaPerseus 1.0," BetaPerseus 2.0," and "BetaPerseus 3.0," respectively. BetaPerseus 2.0 also experienced some evolutions called "BetaPerseus 2.4" and "SuperPerseus," which are represented by nodes 152, 162, respectively.

This hierarchy consists of binary relationships; that is, each relationship requires one parent and one child. The product type relationships of FIG. I are constrained by a rule that each child may have only one parent. There is no rule restricting the number of children a parent may have in this hierarchy.

Various applications use the information in the VDF implementation to perform different functions for the enterprise. In one application, the VDF relationships in the illustrated hierarchy are used to determine that the product named "SuperPerseus" is actually a version of the BetaPerseus model that is based on version 2.4. In another application, the VDF names are used to help provide names for products as new products are developed by automatically including the product type and model name and by preventing the re-use of an existing version number. Embodiments of this application enforce a rule that each name shall be unique. The enterprise uses the VDF with other embodiments of such an application to enforce other naming rules, such as requiring the model name shall be part of the device name. In this case the ambiguous name "SuperPerseus" is not allowed, and is discarded in favor of the automatic name, "BetaPerseus 2.5", or some allowed variation of that, which is stored as the name of node 162.

The vocabulary data framework (VDF) captures simultaneous multiple relationships among names, products, solutions, services, documentation and activities for an enterprise. In particular, the VDF allows other relationships to be established between nodes simultaneously with the product type relationship. Furthermore, the VDF allows any of these new relationships to involve more than the two nodes of the binary parent-child relationship already described. For example, it allows a trinary relationship among a father node, a mother node, and a child node. In general, the VDF allows N-ary relationships among nodes, where N is any integer equal to or greater than one and specifies the number of participants in the relationship.

In the more general realm of the VDF, the enterprise is considered a data domain that includes many atomic concepts that may be related. Atomic concepts include any data item involved in the enterprise that is not subdivided into separately referenced storage units. These atomic concepts include the business vocabulary for the enterprise data that is the subject of the present invention. Concepts include product type names, as in the above example, but also comprise names of projects and departments and references to paragraphs, chapters, documents, images, multimedia files, database records, database queries, network resources, citations, and network addresses, among other things. The concepts and relationships are captured in conceptual graphs which are organized primarily by a partial-order relationship, commonly known as a type hierarchy. The concepts are nodes in the graph and the relationships are connections between two or more nodes. Both concepts and relationships have enumerated characteristics in some embodiments.

The graph of FIG. 1 is an example of a conceptual graph ordered by its product type hierarchy of binary (parent-child) relationships. Whereas this is one example based on a product type hierarchy, the VDF allows for simultaneous and inter-related multiple type hierarchies, as is explained in more detail in the following sections.

2.1 Multiple Hierarchies

As seen above in FIG. 1, concepts are related in a graph depicting product types. All the concepts in this graph are associated with one category of information in the enterprise data. That category is device product types, and that hierarchy relates concepts for products that are related in development history, structure or function. However, enterprise data may include other categories or relationships. In general, multiple categories encompass the enterprise data For example, some of the enterprise data for an enterprise that manufactures and sells network devices are related to equipment solutions for common networking problems encountered by customers of the enterprise. Products of the enterprise that are unrelated by the hierarchy of FIG. 1 nevertheless may be useful to solve the same kind of customer problem. Thus, such products relate to the same solution. To reflect these relationships, enterprise data also are placed in a category called networking solutions in one embodiment, and are organized in a solutions hierarchy that exists concurrently with the product type hierarchy.

FIG. 2A depicts an example hierarchy of concepts in a networking solutions category. In this example, three solutions expressed by the concepts "single server local net," "wide area net (2 sites)" and "private wide area net (3 to 8 sites)" are stored in the data structures representing nodes 212, 214, 216, respectively. All three nodes are children of the root node 202 having name "networking solutions" for this category of concepts. In the solutions type hierarchy of FIG. 2A, arrow 205 represents a networking solutions parent/child relationship. All the relationships represented by arrows in FIG. 2A are of this type. This relationship type differs from the product type parent/child relationship represented by arrow 105 of FIG. 1. Both relationship types are parent/child binary relationships, but they relate concepts in different categories.

As shown in the example of FIG. 2A, the product GammaPerseus, at node 232, is part of the equipment solution for single server local networks of node 212. Both AlphaPerseus, at node 234 and Jason at node 235 are part of the equipment solution for wide area networks connecting two sites, at node 214. BetaPerseus 2.0, at node 236, and Hercules, at node 237, are part of the equipment solution for private wide area networks connecting three to eight sites represented by node 216. Nodes 242 and 244 represent software products Pegasus 3.3 and a graphical user interface (GUI) upgrade that are installed on the BetaPerseus 2.0 device in addition to the default software that comes with that device.

The concepts at nodes 202, 212, 214, 216 may be placed in a category called networking solutions. The concepts 232, 234, 235, 236, 237 have already been placed in a category called enterprise device products; but they may also be placed in the category networking solutions. The concepts at nodes 242, 244 may be placed in a category called software products and also in the networking solutions category. FIG. 2A demonstrates that hierarchies of concepts in categories of enterprise data may be defined in addition to the hierarchy of concepts in the product type category, and demonstrates that categories may overlap.

Alternatively, non-overlapping categories are used in other embodiments. In such an embodiment, the relationship represented by arrow 205 is expressed as a relationship of a subcomponent to a component of a networking solution, in which the sub-component may be a different category than the component. Rules can be expressed for the relationship. One possible rule is: software can be a sub-component of hardware, but not the other way around. Similarly, a product can be a sub-component of a networking solution category but not the other way around.

2.2 Non-binary Relationships

FIG. 2B depicts a conceptual graph of an example non-binary relationship. This ternary relationship (also called a 3-ary relationship or three participant relationship) is useful for capturing the expertise of a person in the use of a product in a technology area. In this example, this relationship is used to state whether the expertise of a technician in the use of a product device within a technology area is of a quality that can assume values of "unknown," "poor," "average," "good," or "excellent."

The characteristics of the relationship type describe the number of participants and their category or categories. In this example the relationship type includes characteristics that indicate there are three participants, one from the user category, one from the technology category and one from the product device category. In addition, the characteristics of this relationship include at least one relationship value for storing the quality of expertise (unknown, poor, average, good, excellent). More details on defining and storing concepts and relationships are given in a later section.

The conceptual graph of this relationship in FIG. 2B shows three nodes 282, 284, 286 representing the three concepts, e.g., product BetaPerseus 2.0, technology private wide area network, and technician Jane, respectively. The three nodes are connected by a three-way, nondirectional link 290. The link 290 includes an attribute named "quality" that takes on a value such as "good," indicating that Jane's expertise is good for using BetaPerseus 2.0 in private, wide area networks.

2.3 Documentation Category

Another category of concepts that is extremely useful to an enterprise, for both internal and external users, is documentation concepts, which encapsulate elements of electronic or tangible documents. Concepts within a documentation category include headings, sections, paragraphs, drawings, images, information type, and document type, among others. Information type concepts express the type of content in terms of what it says; for example, information type concepts include but are not limited to "Introduction," "Features & Benefits," "Product Photo," "External Article Section" etc. Documentation concepts may be organized in a document type hierarchy that facilitates automatically generating accurate, complete, up-to-date visual or printed documentation pertaining to a particular product or service. Document type hierarchies include, for example, "Data Sheet," "Product Home Page," "Press Release," "Operator's Manual," and "External Article." For example, a device, like the hypothetical Beta Perseus 2.0, can be linked by a relationship to a document type hierarchy describing the device, such as a "Perseus 2.0 Operator's Manual." As another example, a device, like the Beta Perseus 2.0, can be linked by a relationship to a section concept in a document type hierarchy describing the networking solutions of which the device is a component, such as a "Small Business Networking Press Release." More examples of document categories of concepts are given in a later section.

2.4 Multiple Inter-related Hierarchies

As seen in the above examples, a single concept, such as the device product BetaPerseus 2.0 may appear in several separate hierarchies. According to one embodiment, information defining the concept is stored only once in the VDF and relationships are defined to all other nodes to which the concept is adjacent in all the hierarchies.

Hierarchies may be implemented using a variety of programming techniques and data storage. One advantage of this approach is that changes to the concept can be made in only one location in the VDF and all hierarchies immediately become up-to-date and reflect the changes. Further, all information generated based upon the hierarchies, such as documentation or screen displays, automatically reflects the changes.

Another advantage is that applications that retrieve the data can navigate one of the hierarchies to a particular concept and then immediately find the other hierarchies in which that concept occupies a node. Thus, a customer who has purchased a particular device product for one networking solution can determine other solutions that use that same device. The customer follows the current solution to the product and then reviews the relationships with other networking solutions of interest to the customer that utilize the device. When a networking solution of interest is found using the device, the newly found solution can be navigated above and below the node representing the device concept in order to determine what software and other devices, if any, are components and sub-components of the new solution. Further, the customer can search by solution and identify multiple products that can satisfy the solution. The customer can then inspect each of the products, obtain its documentation, and determine which product is best suited to the customer's particular needs. In some embodiments, such information is synchronized with the customer's online profile so that it is available for later reference and can be personalized.

FIG. 3 is an example of a conceptual graph for multiple inter-related hierarchies that are associated with the device product BetaPerseus 2.0, based on the individual hierarchies and relationships of FIG. 1, FIG. 2A and FIG. 2B. The branch of the device product type hierarchy of FIG. 1 that includes the BetaPerseus 2.0 device concept appears as nodes 302, 304, 306, 308, 390, 310 and 312 linked by the device product type, binary parent/child relationships 301. The branch of the device networking solutions hierarchy of FIG. 2A that includes the BetaPerseus 2.0 device appears as nodes 322,324, 390, 332 and 334 linked by the networking solutions type, binary parent/child relationships 321. The 3-participant expertise relationship 391 links the node 390 for the BetaPerseus 2.0 to the concept "Jane" at node 346 and the concept "private wide area networks" at node 356. Also shown is that the concept "Jane" at node 346 is a child of the concept "technicians" at node 344 which is a child of the concept "users" at node 342. These nodes are linked by user type, binary parent/child relationships represented by arrows 341. Also shown is that the concept "private wide area networks" at node 356 is a child of the concept "wide area networks" at node 354 which is a child of the concept "technologies" at node 352. These nodes are linked by technology type, binary parent/child relationships represented by arrows 351.

The BetaPerseus 2.0 concept at node 390 is linked to the following nodes in multiple inter-related hierarchies. The BetaPerseus 2.0 concept at node 390 is a product type child of the BetaPerseus 1.0 concept at node 308, as represented by arrow 301*d*. The BetaPerseus 2.0 concept at node 390 is a product type parent of the BetaPerseus 2.4 concept at node 310, as represented by arrow 301*e*, and the BetaPerseus 3.0 concept at node 312, as represented by arrow 301*f*. The BetaPerseus 2.0 concept at node 390 is further a solutions type sub-component of the private wide area net (3 to 8 sites) concept at node 324, as represented by arrow 321*b*. The BetaPerseus 2.0 concept at node 390 has solutions type sub-components of the Pegasus 3.3 software tools concept at node 332, as represented by arrow 321*c*, and the management software GUI upgrade concept at node 334, as represented by arrow 321d. The BetaPerseus 2.0 concept at node 390 has two companion expertise type participants as represented by link 391; one at Jane represented by node 346 and one at private wide area networks represented by node 356. In all, the example concept at node 390 has 6 binary relationships and one ternary relationship with eight nodes in four hierarchies (product type, equipment solutions, users and technologies). Each of the concepts and relationships may be represented using stored data in a database or appropriate programmatic data structures.

Many of the other nodes in FIG. 3 may have relationships with other hierarchies in addition to the relationships shown. These other relationships are omitted so that FIG. 3 and this discussion are more clear. Multiple relationships similar to the examples listed for node 390 may be defined for these other nodes.

2.5 Root Concepts

At the top of each hierarchy for each category is a category root node representing the category root concept from which all the other concepts in the category branch. For convenience in navigating from one category to the next, each of the category root nodes is made a child of an enterprise data root node representing a top-level pseudo-concept for the enterprise data. In one embodiment, the pseudo-concept is "Vocabulary," and every node related to the Vocabulary concept by a direct "child of" relationship is a root node representing a root concept for one category.

2.6 Implementation of the VDF

One embodiment uses a rule-base and declarative computation approach to express the concepts, relationships and rules of the VDF. This approach may be implemented using a high level computer programming language. In one embodiment, the approach is implemented using a logical processing language such as PROLOG™. The high level logical processing language translates statements declaring types and statements expressing rules about combining types into another language, such as the C programming language, that can be compiled and run on a large variety of general-purpose computer platforms.

In this embodiment, the concepts, relationships, attributes and logical implications (including integrity constraints and general computations) are expressed as logical assertions. There are two kinds of logical assertions, facts and rules. A fact is a logical assertion that is considered unconditionally true. A rule is a logical assertion whose truth or lack of truth depends on the truth or lack thereof of other assertions. In this implementation, concepts, relationships and attributes are generally represented as facts, whereas logical implications are represented using rules.

2.6.1 Defining Concepts

For example, in one embodiment, a statement declaring that the phrase BetaPerseus 2.0 is a concept is presented in a high level logical processing language by the expression:

('BetaPerseus 2.0', isConcept)

Similar expressions are used to enter the other concepts in the vocabulary.

The concept may have several attributes besides the phrase that defines it. For example the concept may have a creation date and an author. Attributes of a concept are presented with the following expression:

('BetaPerseus 2.0', 'creation', 'Sep. 19, 2000', 'author', 'John Smith')

2.6.2 Defining Relationships

The relationships that constitute a hierarchy connect one concept to one or more other concepts. Relationships are defined with the following expression:

(r('ConceptX', 'ConceptY', 'ConceptZ'), relationship (rID))

where r is a name for the relationship type, ConceptX, ConceptY and ConceptZ are the three concepts related by this statement, making the relationship r a ternary relationship, and this particular relationship has a unique relationship identification number rID. To ensure uniqueness, the value of rID is supplied when the relationship is defined by the system performing the logical processing. Using this expression, the "product type child of" relationship can be defined by the statement:

(product_child_of ('BetaPerseus 2.0', 'BetaPerseus 1.0'), relationship (rID2)).

According to this statement, the relationship rID2 links BetaPerseus 2.0 to BetaPerseus 1.0 by a relationship of relationship type "product_child_of."

The ternary relationship of FIG. 2B is defined, after each of the individual concepts are defined, by the expression:

(expertise('BetaPerseus 2.0', 'Jane', 'wide area networks'), relationship (rID3).

According to this statement, the relationship rID3 links the concept BetaPerseus 2.0 with the concept 'Jane' and the concept 'wide area networks' by a relationship of type "expertise."

Similarly, a marketing document stored as a Web page on a network and identified by its universal resources Locator (URL) address 'http:///www.Enterprise.com/literature/devices/catalog/Chap2/' is related to the concept 'BetaPerseus 2.0' by the expression:

(marketDoc('BetaPerseus 2.0', 'http:///www.Enterprise.com/literature/devices/catalog/Chap2/'), relationship (rID4))

The system returns a unique value for rID4, which is used to reference this particular relationship of type marketDoc in later statements.

The relationships defined above can also be given attributes according to this embodiment. Typical relationship attributes include the author of the relationship and the date the relationship is created. These attributes are set for a relationship having an unique identification of rID1 with the expressions:

(rID1, 'creator', 'John Dow')

(rID1, 'date', 'Oct. 10, 2000').

Relationships may have other attributes. For example, the expertise relationship defined above has an attribute for the quality of the expertise, which, in the instance of Jane on wide area networks for the BetaPerseus2.0, is good. This attribute is expressed in this embodiment as follows (rID3, 'quality', 'good')

where rID3 is the unique identification for the expertise relationship among Jane, BetaPerseus 2.0 and wide area networks returned by the system when the relationship was created, as described above.

A relationship can also be defined for other relationships. For example, a relationship of type "revision" is used to track changes in another relationship.

(revision (rID5, rID6), relationship (rID7))

The use of the revision relationship is illustrated in the following. If the marketing document for the BetaPerseus 2.0 is changed to a different URL, 'http://www.Enterprise.com/Hello/Chap2/', a new relationship is formed by the statement (marketDoc('BetaPerseus 2.0', 'http://www.Enterprise.com/Hello/Chap2/'), relationship (rID8))

To show that his new relationship with identification rID8 is just a revision of the old relationship with identification rID4 (see above), the revision relationship type is used as follows:

(revision (rID4, rID8), relationship (rID9))

Now, relationship rID9 associated with old relationship rID4 can be used to determine the new relationship rID8 that replaces the old relationship rID4.

2.6.3 Defining Rules

The hierarchies that relate concepts may have to follow certain rules. For example, as stated above, the product type hierarchy requires that a child have only one parent. These rules are enforced using logical constraints defined in a high level logical processing language as rules. A constraint that detects multiple parents in a set of expressions in the high level logical processing language of one embodiment is given by the expression:

(constraint(ConceptC, multiparent (ConceptP1, conceptP2)))

if(ConceptC, childOf, ConceptP1) , (ConceptC, childOf, ConceptP2),

ConceptP1~=ConceptP2.

which reads, ConceptC has multiple parents ConceptP1 and ConceptP2 if ConceptC is a child of ConceptP1 and ConceptC is a child of ConceptP2 and ConceptP1 is not equal to ConceptP2. A statement is inserted which throws an error if the multiparent constraint is detected.

Another example of a rule that is enforced in the high level logical language as a constraint is the rule that every concept must be a descendent of a root concept. As described above, a root concept is a concept that is a child of the pseudo concept "Vocabulary." A concept is a descendent of the concept Vocabulary if the concept Vocabulary is reachable from the concept by a succession of one or more "child of" relationships. If the concept Vocabulary cannot be reached from a given concept, then the given concept is an orphan concept. Orphan concepts are a violation of the rules for the product type hierarchy and generally result from errors in concept definitions or are introduced when a parent concept is deleted from the hierarchy. This constraint depends on a definition of "reachable." Reachable is defined as follows:

(reachable(ConceptX,ConceptY)) if (ConceptX, childOf, ConceptY)
(reachable(ConceptX,ConceptY)) if (reachable (ConceptX,ConceptW)),
(reachable (ConceptW,ConceptY))

which reads, ConceptX reaches ConceptY either if ConceptX is a child of ConceptY or if there is a ConceptW such that ConceptX reaches ConceptW and ConceptW reaches ConceptY. The constraint is then expressed as follows:

(constraint (ConceptC, orphanConcept)) if~(reachable (ConceptC,'Vocabulary'))

which reads, ConceptC is an orphan concept if ConceptC does not reach the pseudo concept "vocabulary." A statement is inserted which throws an error if the orphanConcept constraint is detected.

As discussed above, the example expressions presented in this section are processed by the high level logical processing system to generate code, such as C language code, that implements the concepts, relationships and constraints defined in these expressions. The C language code can then be compiled and executed on any computer system with a C compiler. Further, the C language code can be incorporated in other application programs or compiled into libraries having functions that are called from separate application programs.

3.0 Vocabulary Database

A vocabulary database provides persistent storage for the concepts, relationships, and rules of the vocabulary data framework for the enterprise data.

One embodiment uses a relational database to store the concepts and the relationships among concepts and the rules; however, any suitable data store can be used. In one specific embodiment, a cached data store is used. A relational database uses a schema to describe a series of tables each made up of one or more rows, each made up of one or more fields. The schema names the table and the fields of each row of the table. An example relational database schema to implement the VDF according to one embodiment is described below. In some embodiments the relational database includes a unique row identification number (rowID) for each row in each table.

In this embodiment, a vocabulary table includes a row for each root concept in the VDF. The fields of each row include the concept name, the concept description and the creation date, as shown in Table 1. A unique rowID may also be included in each row but is not shown in the example tables. Example root concepts are included in several rows of Table 1.

TABLE 1

The Vocabulary Table

| Root Category Name | Description | Creation Date |
|---|---|---|
| Product | Product category | 4/12/2000 |
| User | User category | 4/12/2000 |
| Technology | Technology Category | 5/15/2000 |
| Solution | Networking Solutions Category | 1/01/2001 |

Each root concept in the vocabulary table has its own table comprising one row for every concept within the category. All concepts that are descendants of the root concept via the "child of" relationship are stored in the table defined by the root concept. Table 2 is an example Table for the Product root concept.

TABLE 2

The Product Category Table

| Name | Description | Creation Date |
|---|---|---|
| Network Device Products | Enterprise devices | 4/12/00 |
| Perseus | router product | 4/12/00 |
| Hercules | gateway product | 4/12/00 |
| Jason | hub product | 4/12/00 |
| AlphaPerseus | router product | 4/12/00 |
| BetaPerseus | router product | 6/16/00 |
| BetaPerseus 1.0 | router product | 6/16/00 |
| GammaPerseus | router product | 9/19/00 |
| BetaPerseus 2.0 | router product | 9/19/00 |
| BetaPerseus 2.4 | router product | 12/12/00 |
| BetaPerseus 3.0 | router product | 1/01/01 |
| SuperPerseus | router product | 2/01/01 |

Several tables are employed to store relationships. These tables support N-ary relationships. The relationship type table holds one row for each relationship type, as illustrated in Table 3 for some sample relationship types described above. The table rows include fields for the name of the relationship type, as used in the high level language or conceptual graphs, a fuller description of the relationship, the number of participants and the creation date.

TABLE 3

The Relationship Types Table

| Relationship Type Name | Description | Number of Participants | Creation Date |
|---|---|---|---|
| product_child_of | product lineage | 2 | 4/12/2000 |
| solution_child_of | solution lineage | 2 | 4/12/2000 |
| user_child_of | user categories | 2 | 4/12/2000 |
| technology_child_of | technology lineage | 2 | 4/12/2000 |
| expertise | expertise of person with product in technology | 3 | 1/01/2001 |
| martketDoc | Marketing document for product | 2 | 9/19/2000 |
| revision | track revisions in concepts/relationships | 2 | 2/01/01 |

The participant type table holds one row for each participant type in a relationship type, as illustrated in Table 4 for the example relationships of Table 3. This table has a row for each participant of each relationships type. Each row has fields for the name of the relationship type, the role of the participant in the relationship, and the participant type, which is the category of the concept that may fill the given role in the relationship type.

TABLE 4

The Participant Types Table

| Relationship Name | Role | Participant Type |
|---|---|---|
| product_child_of | child | Product |
| product_child_of | parent | Product |
| solution_child_of | child | Networking Solution/Product |
| solution_child_of | parent | Networking Solution/Product |
| user_child_of | child | User |
| user_child_of | parent | User |
| technology_child_of | child | Technology |
| technology_child_of | parent | Technology |
| expertise | person | User |
| expertise | product | Product |
| expertise | technology | Technology |
| marketDoc | product | Product |

TABLE 4-continued

The Participant Types Table

| Relationship Name | Role | Participant Type |
|---|---|---|
| marketDoc | document | Document |
| revision | old version | Vocabulary/relationshipID |
| revision | new version | Vocabulary/relationshipID |

The relationship instance table (Rinstance table) and the participant instance table (Pinstance table) have entries for every instance of the relationships as they are defined for the enterprise data. An example Rinstance table is shown in Table 5 and an example Pinstance table is shown in Table 6, for some of the relationships described above. When a particular relationship is defined between two or more concepts, a new relationship identification (rID) is generated. In one embodiment the particular relationship ID, rID, is the unique rowID corresponding to the next row in the Rinstance table.

TABLE 5

The Relationship Instance (Rinstance) Table

| rID | Relationship Type Name | Creation Date |
|---|---|---|
| 5000 | product_child_of | 9/19/2000 |
| 5001 | marketDoc | 9/19/2000 |
| 5002 | product_child_of | 9/19/2000 |
| 5003 | expertise | 9/19/2000 |
| 5004 | marketDoc | 9/20/2000 |
| 5005 | revision | 9/20/2000 |

When a "product child of" relationship is created between the BetaPerseus 2.0 and BetaPerseus 1.0 on Sep. 19, 2000, an entry is made into a row of Table 5 and a unique rID of "5000" is generated by the system. Then two rows are added to Table 6 for the two concepts that participate in the "product child of" relationship that has just been added to Table 5. Those two rows each list in the rID field the rID value of "5000" generated for this relationship. One row is generated in Table 6 for the concept BetaPerseus 2.0 in the participant role of child for rID "5000." A second row is generated in Table 6 for the concept BetaPerseus 1.0 in the participant role of parent for rID "5000."

TABLE 6

The Participant Instance (Pinstance) Table

| rID | role | Participant |
|---|---|---|
| 5000 | child | BetaPerseus 2.0 |
| 5000 | parent | BetaPerseus 1.0 |
| 5001 | product | BetaPerseus 2.0 |
| 5001 | document | http:///www.Enterprise.com/literature/devices/catalog/Chap2/' |
| 5002 | child | BetaPerseus 2.4 |
| 5002 | parent | BetaPerseus 2.0 |
| 5003 | person | Jane |
| 5003 | product | BetaPerseus 2.0 |
| 5003 | technology | private wide area net |
| 5004 | product | BetaPerseus 2.0 |
| 5004 | document | http:///www.Enterprise.com/Hello/Chap2/ |
| 5005 | old version | 5001 |
| 5005 | new version | 5004 |

On the same date, in this example, the new product is related to its marketing document with the marketdoc relationship that gets rID "5001." Its participants are listed in Table 6 on the two rows having rID "5001." Later that day a new product_child_of relationship is generated for BetaPerseus 2.4 and receives rID "5002." Its participants are listed in the two rows of Table 6 with rID of "5002." Then the expertise relationship of Jane using the BetaPerseus 2.0 in private wide area networking is established on the same day and gets an rID of "5003." The three participants of that relationship are added to Table 6 in the three rows with an rID value of "5003." The next day, on Sep. 20, 2000, a new marketing document is associated with the product by generating a new marketdoc relationship that receives the rID of "5004." The product and document participants are added to Table 6 in the rows showing an rID value of "5004." Finally, the revision of the marketing document is memorialized with the revision relationship, which receives an rID of "5005." The two participants of the revision relationship are added as two rows to Table 6 having an rID value of "5005" in Table 5. The two participants are the old marketdoc relationship rID of "5001" and the new marketDoc relationship rID of "5004." Though participants are listed in Table 6 with increasing values in the rID field, it is not necessary that the value of rID increase monotonically for the system to operate.

The "is a" relationship is a common relationship that also could be represented with entries in the Relationship Type, Participant Type, Relationship Instance and Participant Instance tables. However, better performance is achieved if all instances of an "is a" relationships are placed in an "Is_A" table. For one embodiment, an example Is_A table is shown in Table 7. For this example, all "product child of" relationships are kept in this Is_A table.

TABLE 7

Is_A Table.

| Concept Name | Parent Concept | Creation Date |
|---|---|---|
| Enterprise Network Device Product | Product | 4/12/2000 |
| Perseus | Enterprise Network Device Product | 4/12/2000 |
| AlphaPerseus | Perseus | 4/12/2000 |

Attributes of concepts and relationships beyond those already included in the above tables are kept in one or more attributes tables. In one embodiment, all these additional attributes of concepts are kept in a single concepts attributes table. Similarly, all the additional attributes of relationships are kept in a single relationships attributes table. Table 8 is an example concepts attributes table for the example concepts described above.

TABLE 8

Concepts Attributes Table.

| Concept Name | Attribute Name | Attribute Value |
|---|---|---|
| BetaPerseus 2.0 | author | John Smith |

Table 9 is an example relationships attributes table for the example relationships described above. The expertise relationship was described above to include an attribute called "quality" for indicating the quality of the expertise using one of the values "unknown," "poor", "average," "good," and "excellent" This relationship type occurred in the relationship having rID of 5003 as shown above in Table 5. Therefore the corresponding entry in the relationships attributes table is given in Table 9.

TABLE 9

Relationships Attributes Table.

| rID | Attribute Name | Attribute Value |
|---|---|---|
| 5003 | quality | good |

The rules that express general computations and constraints on the relationships are also stored in tables. In this embodiment, the rules are stored as text for the high level logical processing language. In this way, the stored rules can be imported directly into a rules engine program of the high level logical processing system. Table 10 is an example rules table including the reachable rule described above.

TABLE 10

Rules Table

| Rule Name | Rule Statement Sequence Number | Rule Statement |
|---|---|---|
| reachable | 1 | reachable (ConceptX, ConceptY) if (ConceptX, childOf, ConceptY) |
| reachable | 2 | reachable (ConceptX, ConceptY) if reachable (ConceptX, ConceptW), reachable (ConceptW, ConceptY) |

One embodiment of the VDF allows multiple concepts from different concept categories to have the same name. The duplicate names are converted to unique identifiers called DupIDs and the unique identifiers are used in the concept database. The duplicates table is used in the conversion process. Table 11 is an example duplicates table for an embodiment in which a product concept and a technology concept both use the name Perseus. In this case, the name inserted into the second row of Table 2 above would be "1234" instead of "Perseus."

TABLE 11

Duplicates Table

| DupID | Name | Category |
|---|---|---|
| 1234 | Perseus | Product |
| 2789 | Perseus | Technology |

One embodiment of the VDF also allows raw terms to be stored in the database. Raw terms are words or phrases that may become a concept at a later time. Raw terms can originate from a wide variety of sources, such as a trade journal article reviewing a product or a customer order. The raw terms are stored in this embodiment in a dedicated table. Table 12 is an example raw term table.

TABLE 12

The Raw Terms Table

| Raw Term Name | Description | Creation Date | Category |
|---|---|---|---|
| SuperPerseus | term for BetaPerseus 2.5 coined by Reviewer A. Newman | 12/12/2000 | Product |
| P-Routers | Term for Perseus routers in customer request from Company A | 9/25/2000 | Product |

4.0 Vocabulary Development Server

The Vocabulary Development Server (VDS) is one or more processes that provide management of and access to the enterprise data in the vocabulary database to other processes in an enterprise data processing system. Herein, the vocabulary database is also called the VDS Concept Database.

In the disclosed embodiment, the VDS includes several object-oriented application program interfaces (APIs). Several of the VDS APIs use function calls that are configured to allow client processes to interact with the database application without a need to know the organization of the database implementation. This allows modifications to be made to the database organization, such as adding relationships or adding or deleting levels to one or more hierarchies, without changing the client processes. All adjustments to changes in the database are accommodated in the VDS APIs.

Figure 4A:
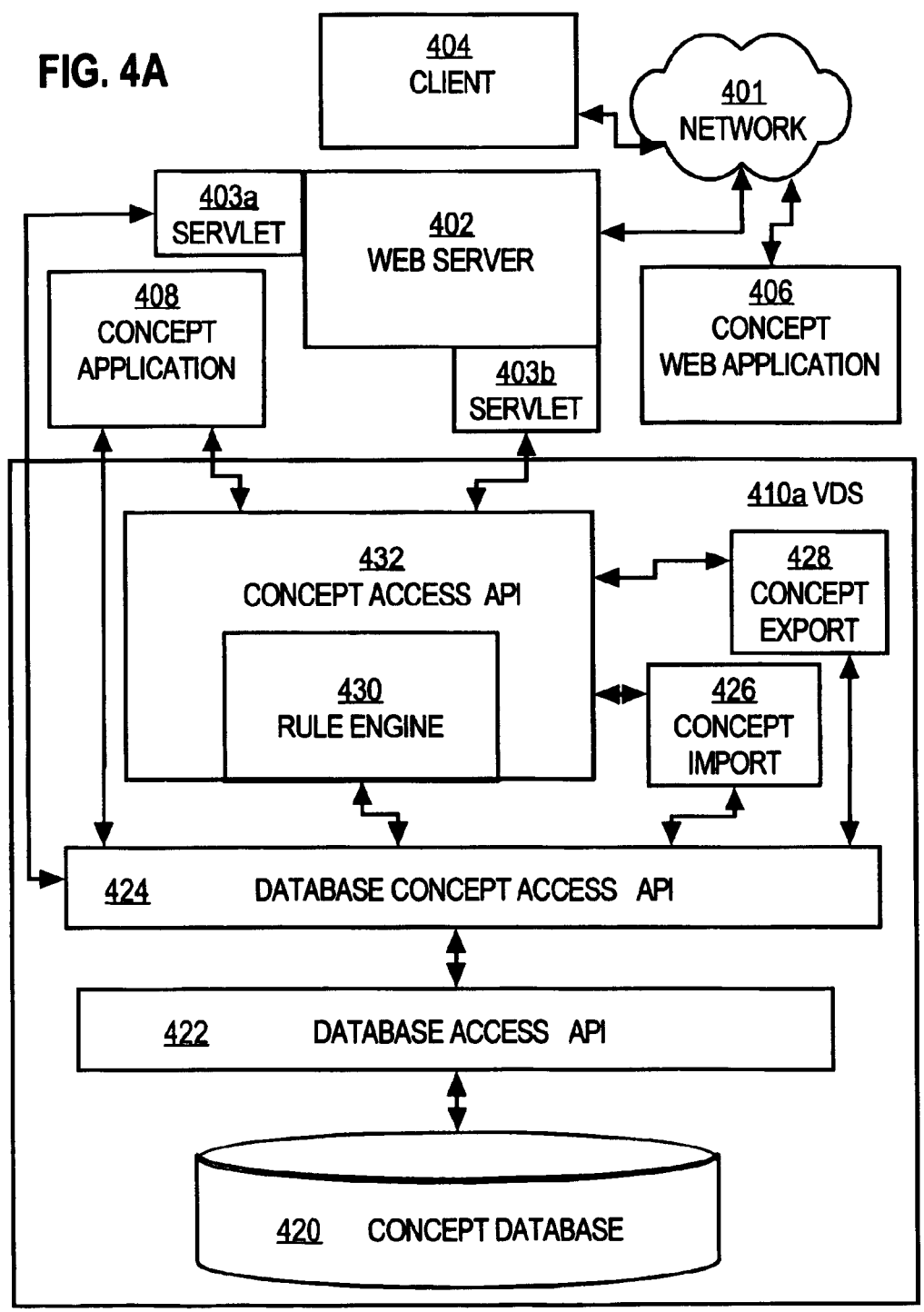
FIG. 4A is a block diagram illustrating a vocabulary development server and external applications according to one embodiment.

FIG. 4A is a block diagram showing the architecture of the VDS 410 and its relationship to some external processes. The VDS Concept database 420 is described above. A database access API 422 provides processes to operate on the database rows and tables based on knowledge of the database schema These processes include connecting to the database, starting a transaction, such as adding, deleting or modifying a row in a table, committing the change in the row to the persistent storage, aborting a transaction, and disconnecting from the database. The database access API 422 also provides processes for adding, deleting, and modifying a raw term in the raw term table.

A database concept access API 424 provides processes for manipulating concepts, relationships and rules in the concept database without requiring knowledge of the actual database schema. For example, processes are included to return all the concepts in a given category, to generate and store a concept category, to add a concept to a category, to return sub-concepts (that is, concepts that are descendent of a given concept), to return child concepts, to return the parent concept of a given concept, to return ancestor concepts, to rename a given concept, to set the parent of a given concept, to delete a concept, and to return duplicate mapping. The database concept access API 424 also includes processes for manipulating relationships, such as to return all relationships, to return all relationship types, to return all "Is_A" relationships, to return all relationships of a given type, to generate and store a relationship type, to generate and store a relationship, to modify a participant or participant type in a relationship type, to modify a participant instance in a relationship instance and to delete a relationship. The database concept access API 424 includes processes for manipulating attributes, such as to return attribute information for all concepts in a given category, to set attribute information, to update attribute information, and to delete attribute information. The database concept access API 424 includes processes for manipulating rules, such as to return all rules in the rule table, to return all rules with a given name, to set the definition of a rule with a given name and sequence number, to generate and store a new rule with a given name and definition, to delete a given rule, and to delete rules with a given name.

The VDS database concept access API 424 is used by applications that are external to the VDS 410, such as concept application 408, and servlet 403*a* of Web Server 402. The VDS database concept access API 424 is also used by other processes within VDS 410, such as the concept import module 426 and the concept export module 428, and the rule engine 430 of the concept access API 432. All elements of FIG. 4A that are shown outside of VDS 410 are shown by way of example, and are not required. Further, the structural elements of VDS 410 are shown as examples and the specific architecture shown is not required.

The concept import module 426 is designed for the bulk import of a large amount of data, splitting that data into concepts, and storing the concepts in the concept database 420. The concept export module 428 is designed for the bulk export of a large number of related concepts and concept attributes to an external system, such as concept application 408, and client 404 or concept web application 406 through the Web server 402 via servlet 403*b*.

The concept access API 432 provides processes for use by other applications that deal with groups of related concepts, or for responding to queries about concepts, relationships and rules that are received from external application programs. The API is used, for example, by the concept application 408 and servlet 403*b* of Web server 402 which are technically client processes of the VDS. Through network 401 and the Web server 402, a standalone client 404 such as a Web browser or a concept Web application 406 obtains and uses concept data. These are technically client processes of the Web server 402.

The concept access API 432 groups related concepts based on the requests made by the client processes. The concept definitions and relationships are checked to determine that constraints are not violated. Rules that are employed to define the computations or constraints employed by the concepts and relationships are obtained from the concept database 420 through the database concept access API 424, are converted to executable statements, and are executed by the rule engine 430 of the concept access API 432.

In one embodiment, the rule engine 430 is integrated with the concept access API 432 through the use of a foreign function facility of the PROLOG™ rule engine. This component provides service functions that enable the rule engine to access information, including rules expressed in text of a high level language, from the concept database 420 through the database concept access API 424. Rule execution functions can execute in the rule engine 430 the rules retrieved from the database 420. These functions marshal the function arguments (such as concepts/relationships/attribute) into the rule arguments, execute the PROLOG™ rule and retrieve any results, and un-marshal the rule results into a results set suitable for returning back to the client process, e.g., the calling application.

In this arrangement the concept database can be continually updated with new concepts, new hierarchies, new levels in old hierarchies, new relationships between hierarchies, and new rules, without requiring changes in the applications such as concept application 408, Web server 402, standalone client 404, or concept Web application 406. Any changes dictated by changes in the database 420 can be accommodated by changes in one or more of the APIs of the VDS, such as database access API 422, database concept access API, and concept access API 432.

4.1 Implementation of the VDF—Alternative Embodiment

According to one embodiment, the VDF is implemented in the form of one or more software elements that programmatically observe the following rules. The desired attributes of the VDS are derived from the Ontology model wherein the real world Objects are modeled as atomic concepts and relationships among the concepts.

1. A Concept is an atomic unit of a company's intellectual property, known as and represented by a Node.
2. A Concept is a normalized name, that is, one and only space character separates the words. Example: "Book title", "Author_name", "Book_written_by".
3. A Concept may have zero or more properties, known as attributes.
4. An Attribute is a (Name, Value) pair, where Name cannot be duplicate in a Node.
5. A set of concepts arranged in a hierarchy represents a taxonomy and may be represented logically or in memory as a Tree. The tree is composed with certain rules:
   a. A tree has a root node, called Category node.
   b. A Category is a concept and it has a name.
   c. A Category cannot be duplicated in a system
   d. A Category has a special node called Orphan Node. When a Concept node is deleted, the children Concept nodes are moved under the Orphan node. The Concepts under the Orphan Node are known as Orphans.
   e. The category node is directly attached to the pseudo node, Vocabulary Node.
   f. A tree should not have duplicate names/concepts. The requirement may be to allow case-sensitivity.
6. A node should have one and only one parent node, except the pseudo node that does not have a parent node.
7. A Concept in a hierarchy may inherit the properties from the parent node unless the property value is set in the node or the parent attribute(s) is not exposed to its children. The inheritance goes all the way up to the pseudo node, known as Vocabulary node.
8. A Concept may have relations with one or more other concepts. The relationships may exist across other taxonomy.
9. A relationship is a Concept whose name is assigned by the system, except for the root relationship nodes, known as Relation Types. A relationship is also referred as Relationship Instance or "Instance."
10. A relationship is a special node that is in addition to having the qualities of a Concept; it has two or more references to other concepts, known as Relationship Participants (in short Participants).
11. A Relationship participant has a Role name and a reference. The role name is simply an identifier for the reference. A Role name cannot be duplicate in a Relationship.
12. A relationship has one and only parent, Relation type.
13. A relation type is a root node for one or more relationship nodes and is a relationship node itself. So the participants for the relation type, known as type participants are the references to Category nodes and Relation type nodes. The relation type node is a template and dictates the possible participants for a relationship instance and the role names for the participant candidates. A relation type is another hierarchical taxonomy, mostly at single level.

The rules for creation and existence of a relationship are:
1. The relationship must have participants from the taxonomy of Categories or Relation types that the relation type specifies.
2. The role name of the instance participant should also match with the specification in the relation type.
3. In a relation type, there should not be any two instances having the same set of participants.
4. If a type participant is pseudo concept Vocabulary, then the relationship instances can have concepts from any taxonomy.
5. A relation type cannot be duplicated in a system.
6. When a Relation instance is removed, the node is simply removed from the Relation type.

7. When a Relation type is removed, all the relation instances and the type are removed from the system.

When a concept is removed, the following processing steps occur:

1. All the relationship instances that this concept is one of participants are removed.
2. The hierarchies of nodes below this concept node are moved to the Orphan node of the Category node.
3. The Concept node is removed from the system.

When a category is removed, the following processing steps occur:

1. All the relationship instances and Relationship types that this category is one of participants are removed.
2. All the Concept nodes including Orphans are removed from the system with relevant relationships.
3. The Category node is removed from the system.

In one embodiment, the VDS is configured in a way that offers good performance in terms of support for a large volume of simultaneous requests, extensibility and adaptability to new business requirements. The VDS provides security and internationalization support for concepts and relationships.

One embodiment uses a rule-base and declarative computation approach to express the concepts, relationships and rules of the VDF. This approach may be implemented using a high level computer programming language. In one embodiment, the approach is implemented using a logical processing language such as PROLOG™. The high level logical processing language translates statements declaring types and statements expressing rules about combining types into another language, such as the C programming language, that can be compiled and run on a large variety of general-purpose computer platforms. This approach relies on the inference power of a declarative engine and reduces coding and implementation that may impose a performance penalty.

Figure 4B:
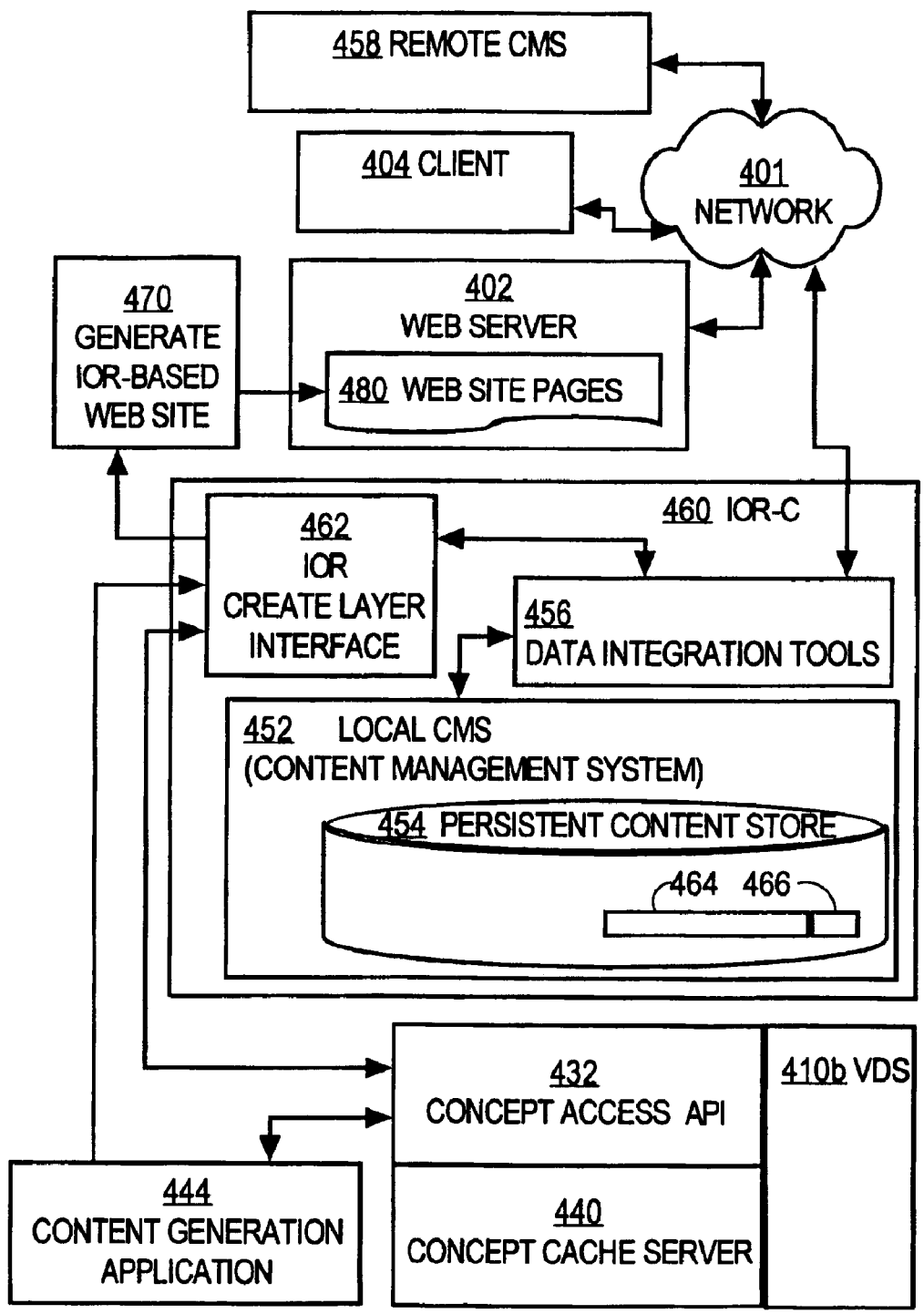
FIG. 4B is a block diagram illustrating a creation layer of an information object repository and a resulting Web site according to one embodiment.
Figure 4C:
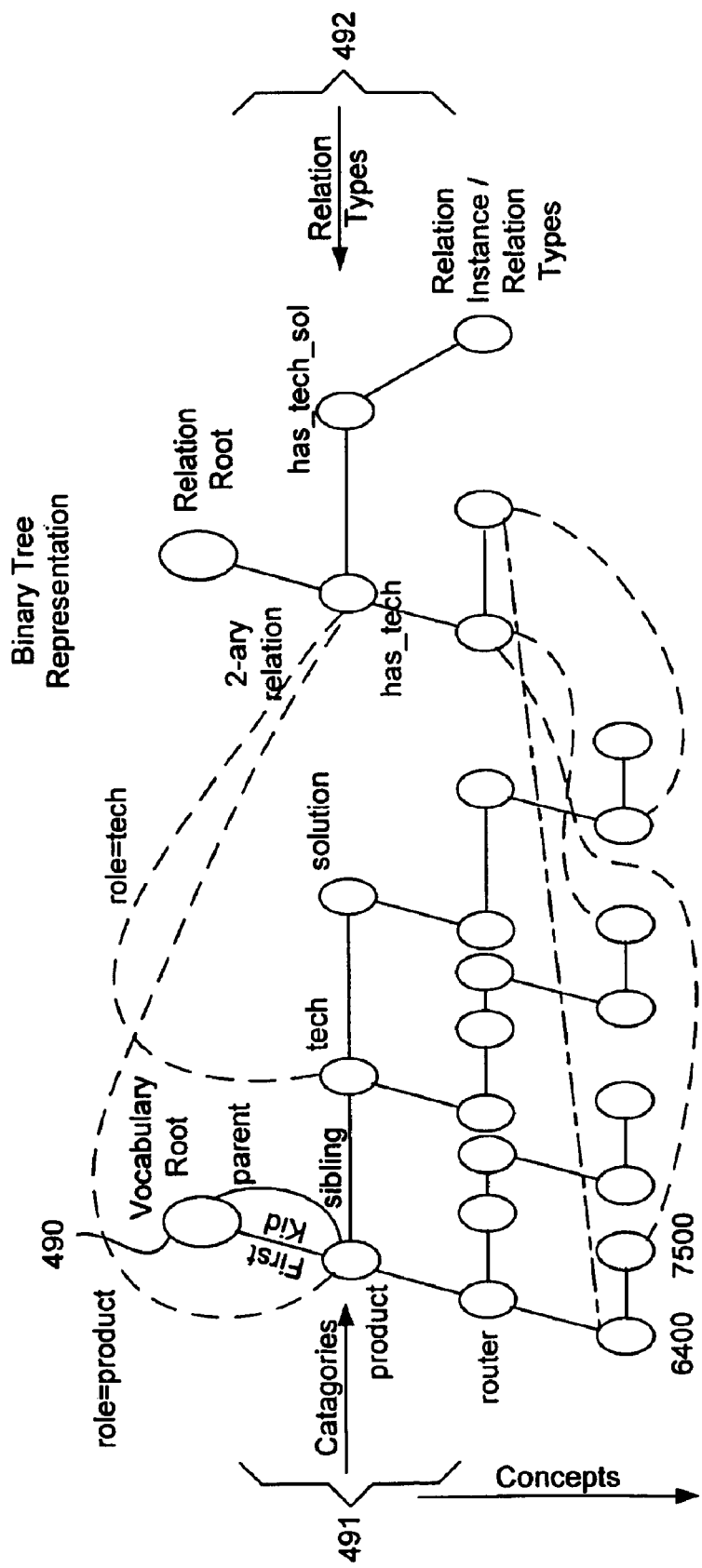
FIG. 4C is a diagram of a binary tree representation that can be modeled using one or more data structures stored in computer memory.

In another approach, the taxonomy of hierarchical concepts and their relationships can be modeled as an in-memory tree data structure. FIG. 4C is a diagram of a binary tree representation that can be modeled using one or more data structures stored in computer memory. This model captures the business logic and is supplemented with constraints placed on the data model as programming logic. One example of such rule could be "a child concept should have one and only one parent." This approach is fast and efficient but has limitation that it uses up the main memory considerably. A file based or database based LRU (Least Recently Used) algorithm implementation would overcome this limitation.

Referring now to FIG. 4C, each of the top-level nodes 491 under the Vocabulary pseudo concept node 490 is a Category node, which implements the additional business logic and facilitates fast lookup and retrieval of concept nodes. Similarly, Relation type node 492 implements additional constraints on the relationship instances and facilitates fast responses to queries of n-ary relationships. A performance response of approximately less than 1 millisecond is achieved by having appropriate indices in the Category and Relation Type nodes 491, 492. A simple Hash Map or a balanced tree data structure could model the in-memory index.

An example for retrieval could be as follows. Assume that the system receives a query getParticipants( ) with a set of arguments the identify participants in a set of relationships. The system is expected to return the matched relationship instances. One approach would be to go through each of the relationship instances and check for the match. When there are millions of instances, this would be slow. Accordingly, in a preferred approach, the following steps are followed to retrieve. the information fast and efficient.

The system maintains an array of relationship instances for each of the participants on the system. The array of instances that have minimum index length is chosen given the query participants. Each element in the array is checked for a match by comparing the query participants and the relationship participants. This is quick and involves less computation. As an example, referring again to FIG. 4C, a fictitious hierarchical model is shown. The Relation1 is a relation type that has index for each of the participant for all the relation instances. Example indices but provided few and the names are given as numbers for explanation.

| Participant | Instances |
| --- | --- |
| 1 | 54001, 54002, 54011, 54202, 54301, 54042 |
| 4 | 54000, 54001, 54042 |
| 8 | 54001, 54202, 54900, 54301, 56899, 63629 |

Now consider a query getRelationship("Relation1", {"4", "8"}) wherein the API returns the relation instance names. A hash table lookup using the relation type name 'Relation1' would return the Relation type Object. The relation type object contains a hash table of participants and arrays of the relationship instances as in the table. A look up on this table using "4" and "8" returns 2 arrays containing relation instances. Now the implementation chooses the array for "4" as it has minimum instances to compare. The system checks "54000" to determine if it is in the list of participant "8"; since it is not present, it is ignored. The system checks the value "54001" in the list of participant "8," and there is a match; and we exhaust all the elements. The result set is a list with one element "54001."

Figure 4D:
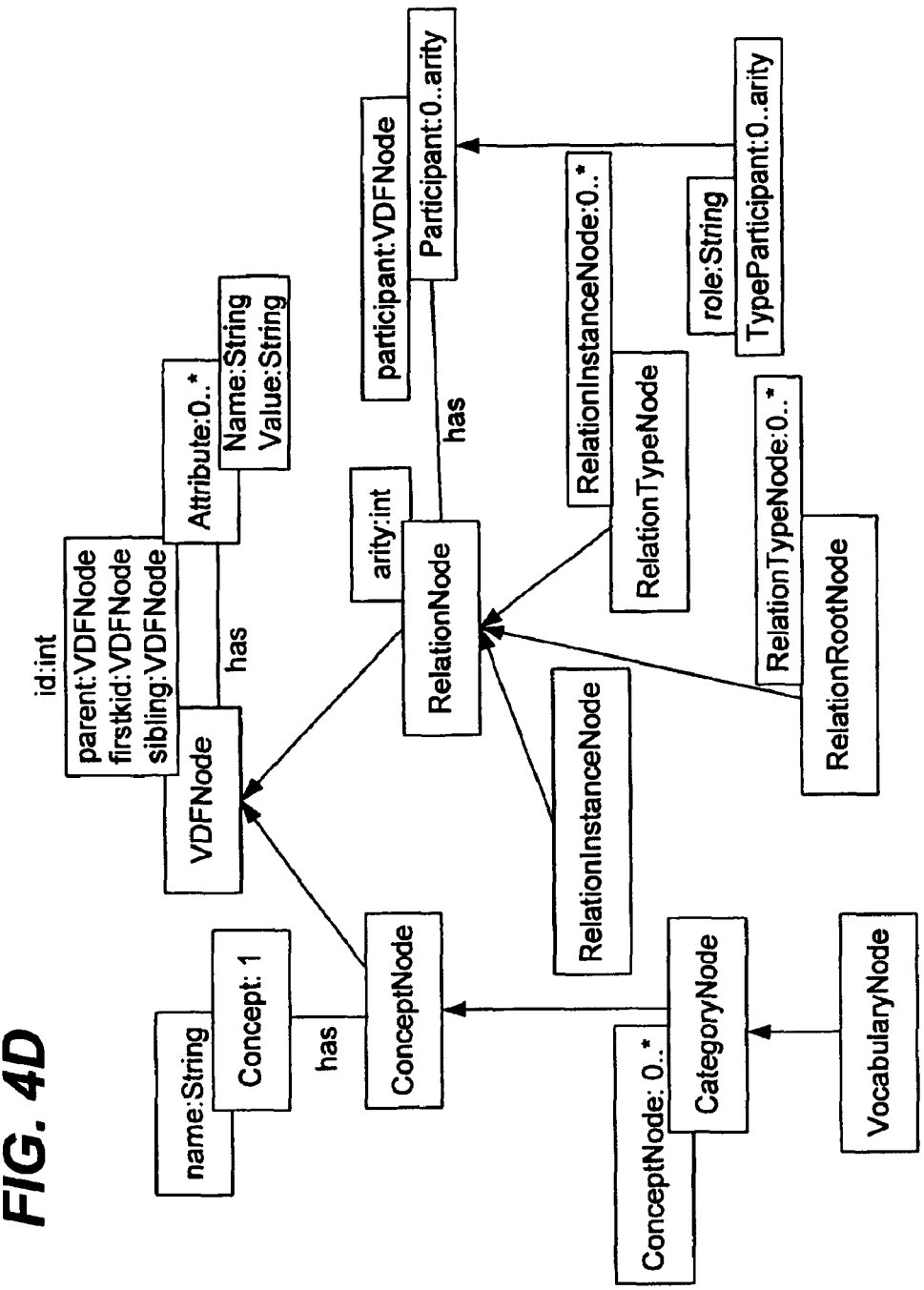
FIG. 4D is a diagram of a class hierarchy of an example object-oriented model.

Embodiments also provide flexibility and adaptability to the new requirement by having an Object Oriented Data Model, which can be implemented in any Object Oriented Language like C++ or Java. FIG. 4D is a diagram of a class hierarchy of an example object-oriented model, in which a class "VDFNode" is the base class that models the tree data structure. Because all the other nodes are inherited from VDFNode, flexibility is provided. For example, causing a Relation Type to have another Relation Type as participant, could be done by having the type participant as VDFNode.

The core classes of an example implementation of the VDS in the Java language are described here. The implementation is shown in Java language, however the implementation could be done in any higher-level programming language, e.g., C, C++, etc.

A ConceptName represents the name of a Concept, as in this code example:

```
public interface ConceptName extends Name {
}
public interface Name {
    public String getName( );
    public void setName(String name);
}
An Attribute class encapsulates a (Name, Value) pair, as in:
public interface Attribute {
    public Name getName( );
    public void setName(Name n);
    public Object getValue( );
    public void setValue(Object v);
```

A VDFNode class implements tree data structure and provides the basic tree operations. It also provides all the get, add and set APIs for attributes. However the set APIs pushes the action upwards in the tree hierarchy, which allows the calls to be trapped by the root level nodes, CategoryNode and RelationTypeNode for enforcing business logic and Access Control. An addChild method goes all the way up until it finds a Node that does checks and calls the actual add implementation__addchild( ) in VDFNode.

```
public abstract class VDFNode {
    private VDFNode parent=null;
    private VDFNode firstKid=null;
    private VDFNode sibling=null;
    private int nodeID;
    private Set attributes=null;
    public void changeAttribute(Attribute attr) {
        // some implementation
    }
    public void addAttribute(Attribute attr) {
        // some implementation
    }
    // more attribute related APIs
    public void addChild(VDFNode n) {
        setChild(this, n);
    }
    public void setChild(VDFNode parent, VDFNode child) {
        VDFNode p=getParent( );
        if (p=null)
            throw new Exception("business logic not found in the hierarchy");
        p.setChild(this, child);
    }
    protected void__addChild(VDFNode n) {
        // imple..
    }
    protected void__removeChild(VDFNode child) {
        VDFNode prev=null;
        if (firstKid==child)
            firstKid=child.sibling;
        else if ((prev=child.getPrevSibling( ))!=null)
            prev.sibling=child.sibling;
        child.sibling=null;
        child.parent=null;
    }
    //more APIs
}
```

A ConceptNode is a VDFNode and has a Normalized Name. Again a call to a set/add method pushes the call up to the root node which sets/adds the Object after the constraint checks.

```
public class ConceptNode extends VDFNode {
    Concept concept=null;
    public void setConcept(Concept c) {
        setConcept(this, c);
    }
    public void setConcept(ConceptNode node, Concept c) {
        VDFNode p=getParent( );
        if (p==null)
            throw new Exception("business logic not found in the hierarchy");
        if (p.getType( )!=Constants.ConceptNode)
            throw new Exception("Invalid node in the hierarchy");
        p.setConcept(node, n);
    }
    protected void__setConcept(Concept c) {
        // this.concept=c;
    }
}
```

A CategoryNode is a root node in taxonomy of concepts. It implements the business rules related to Concepts as stipulated in VDS rules. Here is an example: the setconcept( ) method is implemented here to check for duplicate Concept Name and to set the concept to the target ConceptNode, node. The root node implementation in CategoryNode and RelationTypeNode uses Read/Write Lock Object for efficiency that allows multiple reader threads to go through, instead of Java synchronization that allows single reader thread to pass through the critical path

```
public class CategoryNode extends ConceptNode implements Comparator {
    protected ReadWriteLock rwLock=new ReadWriteLock( );
    protected boolean ignoreCase=true;
    protected TreeMap concepts=null;
    public void setConcept(ConceptNode node, Concept c) {
        rwLock.writeLock( );
        try {
            if (!concepts.contains(c.getName( ))) {
                concepts.put(c.getName( ), node);
                node.__setConcept(c);
            }
            else
                throw new Exception("Concept duplicate.");
        } finally {rwLock.releaseLock( );}
    }
}
```

RelationParticipant has a reference to a VDFNode and role name for the reference.

```
public class RelationParticipant {
    private VDFNode participant=null;
    private String roleName=null;
}
```

A RelationNode is the base class the relationship classes. It captures set Relation Participants with their Role Names. The field 'role__participants' is 2 dimensional array of (Role name, VDFNode). The class provides all the APIs for setting and getting the values in the collection.

```
public abstract class RelationNode extends ConceptNode {
    private HashMap role__participants=null;
    public void addParticipant(RelationParticipant part) {
        setParticipant (this, part);
    }
    public void setParticipant(RelationNode node, RelationParticipant part) {
        VDFNode p=getParent( );
        if (p=null)
            throw new Exception("business logic not found in the hierarchy");
        if (p.getType( )!=Constants.RelationNode)
            throw new Exception("Invalid node in the hierarchy");
        p.setParticipant (node, part);
    }
    protected void__setParticipant(RelationParticipant part) {
        // role__participants.put(part.getRole( ), part);
```

```
}
} public class RelationTypeNode extends RelationNode {
    private ReadWriteLock rwLock=new ReadWriteLock( );
    private HashMap relations=new HashMap( );
    public void setParticipant (RelationNode node, RelationParticipant
    part) {
        rwLock.writeLock( );
        try {
            List list=node.getParticipants( );
            list.add(part);
            if (existsRelation(list))
                throw new Exception("relation already exists with same
                    participants.");
            node._setParticipant(part);
            VDFNode p=participant.getParticipant( );
            // build cache in advance
            List plist=(List)relations.get(p);
            plist.add(part);
        } finally {rwLock.unlock( );}
    }
}
```

4.1.1 Defining Concepts

In one embodiment, a statement declaring that the phrase BetaPerseus 2.0 is a concept is presented in a high level logical processing language by the expression:

new Concept('BetaPerseus 2.0');

Similar expressions are used to enter the other concepts in the vocabulary.

The concept may have several attributes besides the phrase that defines it. For example the concept may have a creation date and an author. Attributes of a concept are presented with the following expression:

concept.addAttribute(new Attribute( 'creation', 'Sep. 19, 2000'));

4.1.2 Defining Relationships

The relationships that constitute a hierarchy connect one concept to one or more other concepts. Relationships are defined with the following expression:

new RelationTypeNodc("prod_can_have_doc", 2);

where "prod_can_have_doc" is a relationship type and "2" is a value associated with the parameter type, i.e., in this example, a product can have 2 documents associated with it.

relationType.addChild(new RelationIntanceNode(new VDFNode[] {conceptNode1, conceptNod2}));

4.1.3 Retrieving Relationships relationType.getRelationship("marketDoc", "BetaPerseus 2.0", "http:///www.Enternrise.com/literature/devices/catalog/Chap2/");

4.1.4 Persistent Data Storage

Figure 4E:
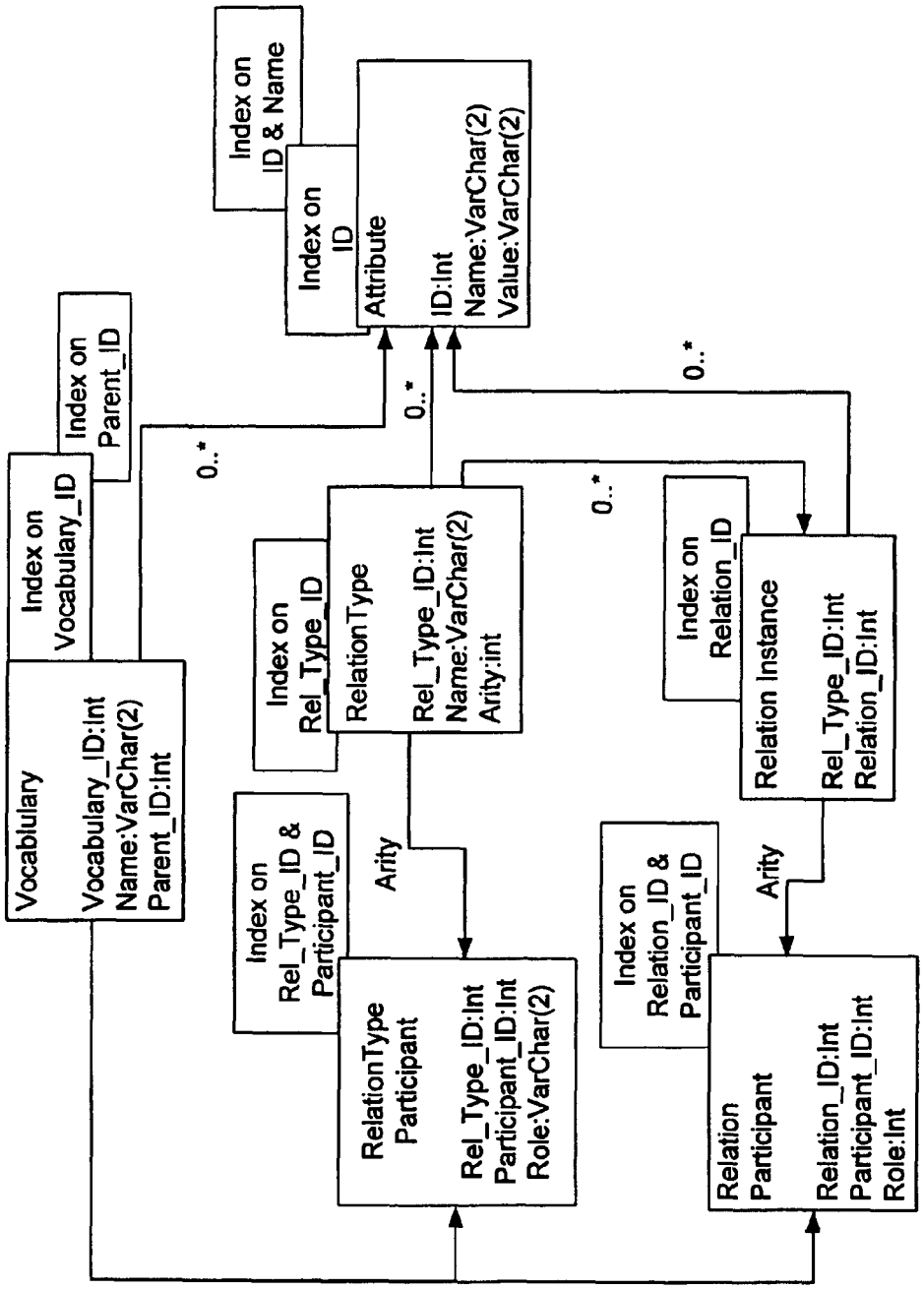
FIG. 4E is a diagram of a data representation schema.

Changes in the VDS system need to be recorded on a permanent store for recovering and backup. VDS uses RDBMS for its persistent storage. FIG. 4E is a diagram of a data representation schema in the form of a fixed set of normalized tables that may be stored in persistent storage. The arrangement of FIG. 4E offers flexibility to model n-ary relationships and m by n level hierarchy. VDS system generates unique ID for each of the nodes as they are created in the system through adding a concept or relationship. These IDs are used as the primary keys in the database tables. The implementation commits the changes to the persistent store at specified interval as a batch update for enhancing performance. This must be accomplished at greater care to avoid loosing changes. This achieved by having a separate Thread that maintains the changes so as to update them to the persistent store at regular interval. The changes are written to transaction.dat, which accumulates the events as they happen in the system, and transaction_history.dat, which maintains the history of transaction files that are to be merged, and that are already merged successfully to the database. The format of the transaction.dat is: command!argument[!argument]* as shown below:

1018!270560607! status_date!2001 06 14 16:56:56
1016!570560601!REL1!2
1017!570560601!57067223

When the Thread wakes up to synchronize the database, it moves transaction.dat under a directory with time-stamp part of filename as in 2001/6/14/19_58_transaction.dat. The thread runs through the lines of the files, composes SQL prepared statements and does the batch updates to the database. As one batch succeeds the lines involved in the batch update are prefixed with '+' sign to indicate that they are merged with the database. This way the server could merge the uncommitted changes to the database incase of error.

+1018!270560607!deploy_status_date!2001 06 14 16:56:56
+1016!570560601!Prod_PCR!2
+1017!570560601!57067223

The transaction_history.dat is a quick index to the thread to find the files that are not fully committed. When the thread merges the changes, it marks appropriate entry in the history files with '+'. A typical history file looks like this:

+/opt/httpd/root/apps/mdf-sr/7213copy/2001/6/14/16_56_yacs_tran.dat
+/opt/httpd/root/apps/mdf-sr/7213copy/2001/6/14/17_57_yacs_tran.dat
/opt/httpd/root/apps/mdf-sr/7213copy/2001/6/14/18_58_yacs_tran.dat
/opt/httpd/root/apps/mdf-sr/7213copy/2001/6/14/1_58_yacs_tran.dat The Vocabulary Development Server (VDS) is one or more processes that provide management of and access to the enterprise data in the vocabulary database to other processes in an enterprise data processing system. Herein, the vocabulary database is also called the VDS Concept Database.

Figure 4F:
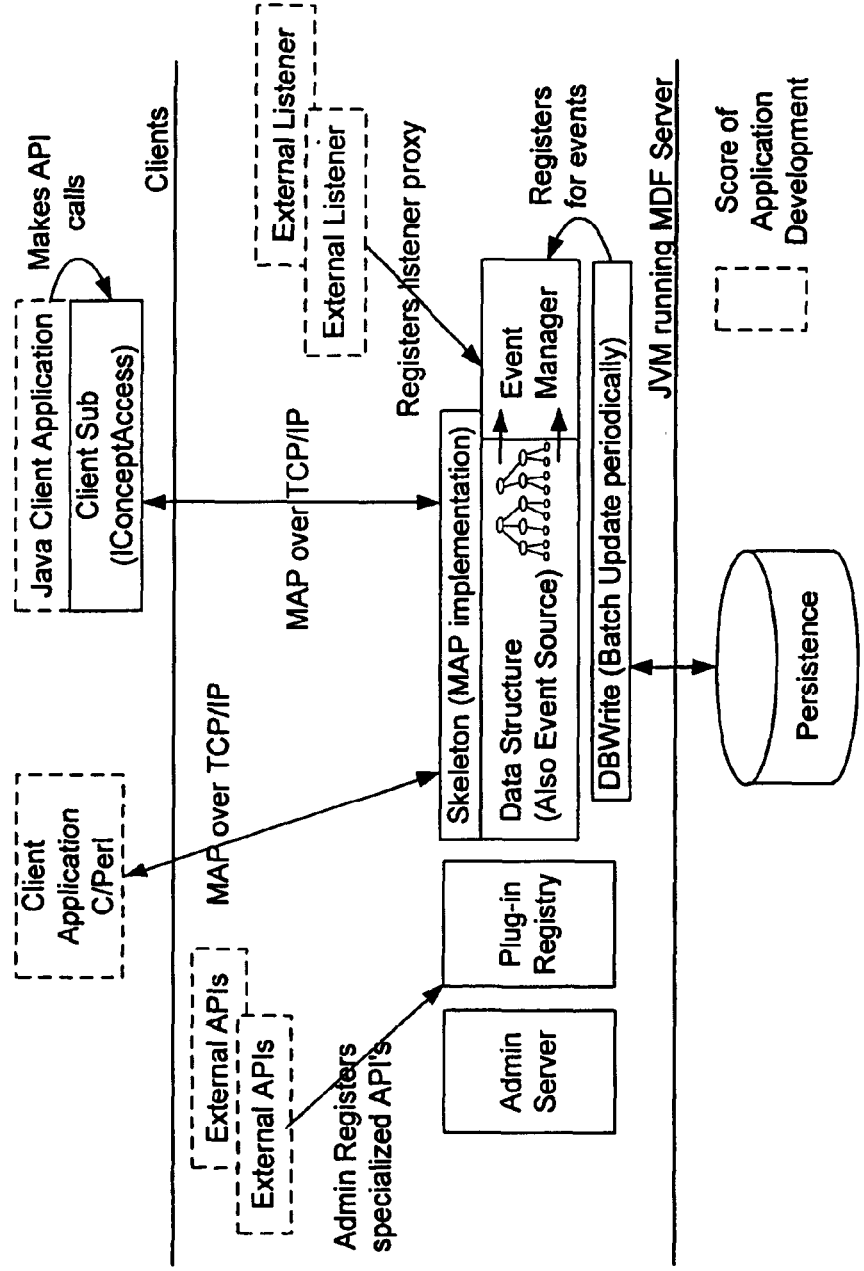
FIG. 4F is a block diagram of an example architecture of the VDS.

FIG. 4F is a block diagram of an example architecture of the VDS according to another embodiment. Services provided by the VDS to clients and applications include vocabulary management and administration. Vocabulary related services are exposed to remote clients through a Metadata Access Protocol (MAP) over TCP/IP or RMI. Administration is a non-functional requirement but a desired to have features that allows remote monitoring, server fine-tuning.

MAP is designed for performance enhancement over RMI based approach. MAP is language neutral protocol wherein the request and response are transmitted over TCP/IP as tokens. The client application must know to assemble the tokens into the desired return result. The request format is:

Command_Identifier!Arguments_separated by_!
Example
getChildConcepts!Category!
   The response format is:
   If Request succeeds, the format is:
   +OK command_code
   <responses in single or multiple lines>
   <CRLF>
   If Request is failed, the format is:
   -ERR!error_code!error_message_in single line 4.1.5 Security VDS is a knowledge repository for storing and establishing Cisco's standard for concept categorization and their relationships. To provide a controlled access and modification to the vocabulary, VDS implements two levels of security, Authentication and Authorization.

For Authentication, VDS supports simple username/password authentication mechanism and will service MAP over SSL in the future. It can be configured to use LDAP service to validate the user. The server also supports generic accounts (for which usernames do not exist in LDAP) through its internal authentication module.

For Authorization, VDS supports access control on all the nodes. Access Control List (ACL) is modeled within VDS as a set of categories and relation types. FIG. 4G is a diagram illustrating relationships among an access control list and nodes of a tree of the type shown in FIG. 4C. Permission on a node is granted to an action provided one the following is true:

1. If the access_mode on the node allows the action
2. If the user is in the group that has the required permission on the node.
3. If the permission on the parent of this node satisfies one of the above.

4.1.6 Internationalization

The VDS system stores the names in double-byte character set. This achievable if the implementation language supports (like Java) or by taking care of it in the implementation by storing the name in appropriate data structure.

4.1.7 VDS Events

Figure 4H:
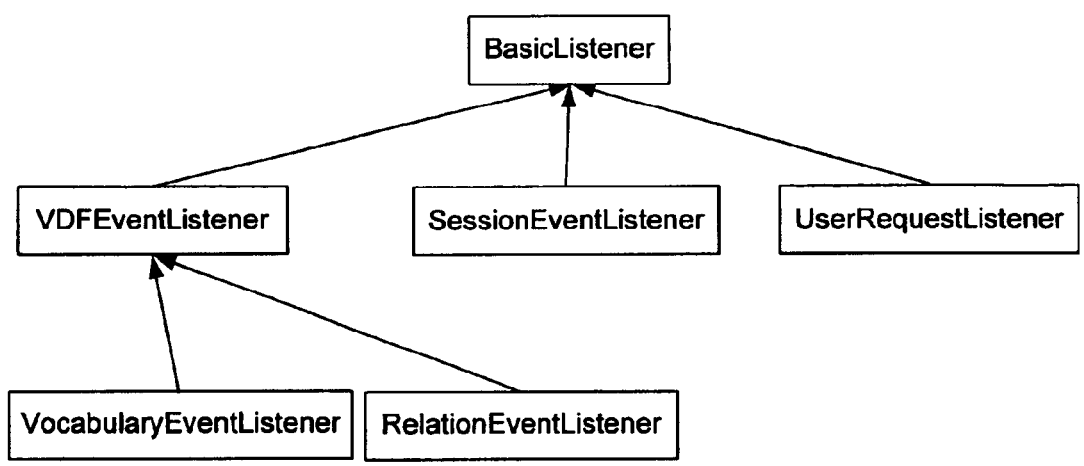
FIG. 4H is a block diagram of a class hierarchy that may be used to implement an event mechanism, in one embodiment.

Events are the best way to have asynchronous communication to external parties like deploy process or client adapters. VDS uses an event mechanism to notify the registered clients about any change in the vocabulary data FIG. 4H is a block diagram of a class hierarchy that may be used to implement an event mechanism, in one embodiment.

5.0 Information Object Repository (IOR)

According to one embodiment, the concept application 408 is an information object repository application. An information object repository (IOR) holds content for documents.

For example, in this embodiment, the marketing document described above at URL address 'http:///www.Enterprise.com/Hello/Chap2/' is in the IOR. The content is stored and retrieved in units of data herein called information objects or "chunks." An IOR application produces documents, such as operating manuals, marketing documents, and Web pages for a Web site by combining one or more information chunks in the IOR. One or more IOR processes employed by the IOR application manage the IOR by relating the content in the IOR to one or more concepts in the concept database 420 and determine the information chunks to incorporate into documents based on one or more relationships in the concept database 420.

Using this technique, content originally unrelated and authored over time by many different persons and organizations can be related using the business vocabulary concepts and relationships in the VDS. Thus a person wishing to learn about the BetaPerseus 2.0 can use an IOR application to find all the manuals, press releases, and articles that describe it no matter when or by whom the document was written, as long as the content is registered with the IOR.

As another example, a system put together by a joint venture can produce a system document that uses descriptions of the components originally written independently by the joint venture partners. In addition, the information chunks supplied to a requestor can be tailored to the person making the request, for example, by providing more technical information to a technical user than to a marketing user. Furthermore, information chunks can easily be reused in several documents. For example, an introductory paragraph for the BetaPerseus 2.0 written for a marketing document can be used in a press release, a data sheet, and the home page for the BetaPersus 2.0 on the Web site of the enterprise.

Embodiments are described herein in the context of examples involving generation of electronic documents in the form of Web pages. Embodiments are applicable to generation of any form of electronic document, and are not limited to use with Web sites or Web pages.

5.1 IOR Creation Layer

One set of IOR processes are used to manage the registration of information chunks into the IOR and the concept database. This set of IOR processes and the data storage for the IOR comprise the creation layer of the IOR, herein designated IOR-C. FIG. 4B is a block diagram illustrating the IOR-C of the IOR according to one embodiment.

In this embodiment, the IOR processes are invoked through an interface 462 for the IOR-C 460. For example, an application programming interface of the IOR-C interface 462 is invoked by a content generation application 444. In another example, an IOR administrator performs administration of the IOR through an administrator user interface of the IOR-C interface 462. In other embodiments the IOR processes execute under control of a standalone IOR batch or user-interactive application.

The IOR-C interface 462 includes methods to access the business vocabulary development server (VDS) 410 of the enterprise through the concept access API 432. As shown in FIG. 4B, this embodiment of the VDS 410b has an external concept access API 432 which uses a concept cache server 440 to speed retrievals from the VDS 410b. The concept cache server 440 uses a cache memory to temporarily store a subset of the concepts and relationships in the concept database (420 in FIG. 4A) of the VDS 410b.

The IOR-C interface 462 includes methods to store and retrieve information chunks in a content management system (CMS) such as in a local CMS 452 or over the network 401 in a remote CMS 458. A CMS includes persistent storage where an information chunk is stored. For example, persistent content store 454 includes information chunk 464.

A CMS is capable of managing a variety of types of information in each information chunk. For example an information chunk may comprise a block of text, an application program, a query for a database, a vector graphic, an image, audio data, video data, and other binary data. The block of text may be text that represents code for a compiler, such as C code, and formatted text, such as text in the Hypertext markup language (HTML) or in the extensible markup language (XML), as well as unformatted text using one of several character codes, such as ANSI one byte and Unicode four byte codes.

In some embodiments, the CMS comprises the local operating system directory structure. For example, different information chunks are simply kept in different files with different file extensions for the different types of data, and the files are organized into one or more directories in a hierarchy of directories and files. In another embodiment, the CMS is a database server for managing a database of information chunks.

It is not necessary that all the information chunks be in a single CMS on one computer device. Data integration tools 456 are commercially available for associating data in one data store or content management system, such as CMS 452, with data in another data store or CMS, such as remote CMS 458. The role of tools 456 is to be a mediator that at run time resolves the semantic and syntax integration issues between data stores that have similar or related data. Appropriate data integration tools also can associate data that is in any other location that can be referenced, i.e., any object that exists, whether it is in a CMS or not, i.e., LDAP directories, Web services, application versioning, network addresses from DNS, physical objects such as bar codes, etc. In the depicted embodiment, the methods of the IOR-C interface access the data integration tools 456. In an embodiment with all the information chunks stored in a single local CMS, the data integration tools 456 are not included, and the methods of the IOR-C interface access the local CMS 452 directly.

Each information chunk in the CMS is identified uniquely by an information chunk reference 466. Depending on the CMS employed, the reference may be a file name, a file name including one or more directories in the hierarchy of directories, a network resource address, a universal resource locator (URL) address, a record identification in a predetermined database, or a record identification in a predetermined content management system.

FIG. 4B also shows a process 470 for generating pages 480 for a Web site on Web server 402 using the IOR-C interface to access the VDS 410 and the persistent content store 454. The process 470 is described in more detail in a later section.

The IOR-C interface 462 includes methods to manage the IOR by relating the information chunks in the CMS to one or more concepts in the concept database 420. The IORC interface includes methods to generate and retrieve information object concepts in the concept database associated with the information chunks. The IOR-C interface also includes methods to generate and retrieve relationships between the information object concepts and other concepts in the concept database.

5.2 Information Objects and Relationships

For each information chunk that is registered in the IOR 460 by a method of the IOR-C interface 462, a particular information object concept is added to the concept database of the VDS 410b. In one embodiment, an information object category is added to the Vocabulary Table (such as the sample Vocabulary Table listed in Table 1). The particular information object is a child of the information object category and is represented as a new row in an Information Object Table. The concept cache server 440 or concept access API 432 is invoked by the IOR-C method to add this concept to the database.

Table 13 lists sample entries in a hypothetical Information Object Table according to this embodiment. In this embodiment, the information object concept has a name that is the unique reference for the corresponding information chunk in the CMS. As shown in Table 13, the unique reference is a URL in this embodiment.

TABLE 13

The Information Object Table

| Name | Description | Creation Date |
| --- | --- | --- |
| http://www.Enterprise.com/literature/devices/catalog/Chap2/ | marketing document for Perseus routers | 9/19/00 |
| http://www.Enterprise.com/Hello/Chap2/ | marketing document for Perseus routers | 9/20/00 |
| ftp://Enterprise.com/literature/devices/Perseus/Intro17.txt/ | BetaPerseus introductory paragraph for silver partner marketing person | 12/12/00 |
| ftp://Enterprise.com/literature/devices/Perseus/Intro5.txt/ | BetaPerseus 2.0 introductory paragraph for technical person | 4/12/00 |
| http://Enterprise.com/datasheets/DS33/ | BetaPerseus 2.0 data sheet table | 4/12/00 |
| http://Enterprise.com/datasheets/DS12/ | Jason data sheet table | 4/12/00 |

Adding the information object concept to the concept database links the concept database to an information chunk in the CMS, but this action alone does not relate one information chunk to another. Once a particular information object concept has been added to the concept database, a relationship is formed with one or more other concepts in corresponding other hierarchies. As each information chunk has an information object concept added to the database and linked to another concept, relationships between the information chunks are implied by the relationships between the corresponding concepts.

For example, an instance of a "has info object" relationship type is added to the database to relate at least one product concept to each information object added. These relationships relate the first and second information objects in Table 13 to the Perseus concept in the product hierarchy, the third information object to BetaPerseus concept, the fourth and fifth information objects to the BetaPerseus 2.0 concept, and the sixth information object to the Jason concept in the product hierarchy. Since both the fourth and fifth information objects are related to the same product concept, by implication the information objects are related to each other. In this way, the information chunks referenced by URLs "ftp://Enterprise.com/literature/devices/Perseus/Intro5.txt/" and http://Enterprise.com/datasheets/DS33/ are related by implication, and can reasonably be placed in the same document in some circumstances. In this example, the two information chunks referenced by the fourth and fifth information objects are closely related even though those two information chunks reside in the CMS in entirely different levels of different subdirectories in the Enterprise.com directory.

Similarly, since BetaPerseus 2.0 is a child of BetaPerseus and BetaPerseus is a child of Perseus in the product hierarchy, the corresponding information objects are implied to share this same hierarchical relationship. Thus one can navigate among the information objects, and their associated information chunks, using the relationships among the concepts related to the information objects. These techniques allow the rich collection of relationships in the concept database to provide organization for the information chunks stored in the CMS.

Figure 5:
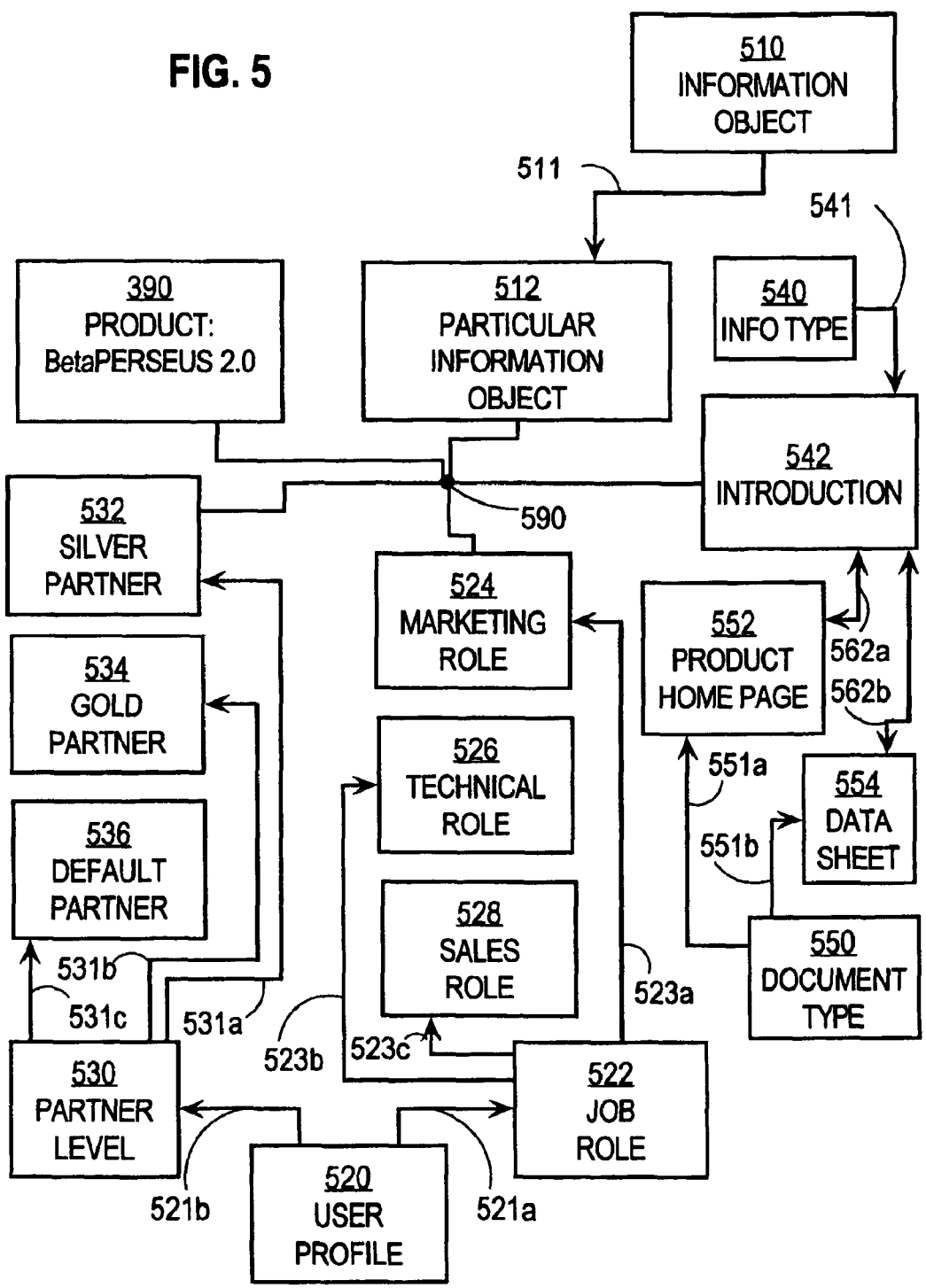
FIG. 5 is a block diagram that illustrates relationships involving a particular information object and other concepts in the vocabulary database.

FIG. 5 is a block diagram that illustrates relationships involving a particular information object and other concepts in the vocabulary database according to another embodiment. According to this embodiment, meaningful documents are produced from information chunks by relating information object concepts not only to a concept in the product hierarchy but also to concepts in an information type hierarchy and concepts in a user profile hierarchy.

A particular information object concept 512 is a child of information object category 510 by the information object child of relationship indicated by arrow 511. The particular information object 512 is a participant in a 5-ary "has info object" relationship indicated by the five-pronged connection 590. This "has info object" relationship involves a concept 390 of the product hierarchy as in the above example, but also involves other concepts. The "has info object" relationship also involves a concept 542 in an information type hierarchy and two concepts in a "user profile" hierarchy, one a child concept 524 of a job role concept 522, and the other a child concept 532 of a partner level concept 530. These other concepts and hierarchies are described in more detail next. The 5 participant "has info object" relationship specifies that a particular information chunk provides a particular information type about a particular product in the product hierarchy of interest to a person playing a particular job role for a particular level of partner to the enterprise. In general the number of participants in the relationship does not have to be limited to 5. It can be all domains that are important in identifying and using an information object.

Introduction concept 542 is a child of an "info type" category 540 by the "info type child of" relationship indicated by arrow 541. According to this embodiment, various documents generated from the information chunks use or reuse one or more concepts of the "info type" category. The "info type" hierarchy is a one level hierarchy below the "info type" category as the root concept. Every different info type concept is a child of the "info type" root concept. The "info type" concepts include "Introduction," "Features and Benefits," "Product Photo," "Schematic Drawing," "Operational Properties," "Data Sheet Table," and "External Article Section," among others.

Each concept of the "info type" hierarchy is related to one or more concepts in a "document type" hierarchy by a "has_docinfo" relationship indicated in FIG. 5 by the double arrow 562. A "position" attribute of the "has_docinfo" relationship indicates where the information chunk corresponding to the information object is placed relative to information chunks corresponding to other information objects in the document. The "document type" hierarchy is a one level hierarchy below the "document type" category as the root concept. Every different document type concept is a child of the "document type" root concept. The "document type" concepts include "Marketing Document," "Product Home Page," "Data Sheet," "Press Release," "Operator's Manual," and "External Article," among others.

The "has_docinfo" relationship, such as 562, provides a specific organization of information chunks to produce a particular document of a given document type. For example, a product marketing document type is a participant in four "has_docinfo" relationships, one each with a "Product Photo" information type concept having a position attribute value "first," an "Introduction" information type concept having a position attribute value "second", a "Features and Benefits" information type having a position attribute value "third" and an "Ordering" information type having a position attribute value "fourth." For another example, a product home Web page document type is a participant in five "has_docinfo" binary relationships, one each with a "Product Name Heading" information type in a first position, a "Introduction" information type in a second position, a "List of Other Info Types for Concept" information type in a third position, a "List of Other Documents for Concept" information type in a fourth position, and a "List of Next Concepts in Hierarchy" information type in the fifth position. The last three information type concepts do not need information objects to provide the content for the Web page document type, because these lists can be derived from the relationships in the VDS for a given concept. By tying information object concepts indirectly to document type concepts through information type concepts, a particular information chunk can be reused in more than one document.

Marketing role concept 524 is a child of a "job role" concept 522 which is a child of a "user profile" category 520 by the "user profile child of" relationship indicated by arrows 523a and 521a, respectively. According to this embodiment, the content in an information chunk for a particular information type for a particular product depends on the job role of the person who is reading the document. The content is expected to be different for a person in a marketing role, concept 524, than one in a technical role, concept 526, or even one in a sales role, concept 528, which may represent some mixture of the content provided for the two other roles. These other job roles are also children of the job role concept 522. Still other job role children concepts are defined in other embodiments. For example, a "default" concept child of the "job role" concept 522 is used for a person who does not play a particular role. This person is treated as an uninitiated member of the general public.

Silver partner concept 532 is a child of a "partner level" concept 530 which is a child of a "user profile" category 520 by the "user profile child of" relationship indicated by arrows 531a and 521b, respectively. According to this embodiment, the content in an information chunk for a particular information type for a particular product depends on the kind of partner to the enterprise is the corporate employer of the person who is reading the document. A gold partner, represented by concept 534, is an entity or affiliate treated as any other member of the enterprise itself. A silver partner, represented by concept 532, has 5 some favorable access to information. A default partner, represented by concept 536, has no formal relationship with the enterprise and is treated as a member of the general public. A partner type is a classification of a consumer of the information that enables the system to narrow down or customize the information presented by the category of the user receiving the information, by simply introducing another concept that describes the category type "partner" that participates in a relationship. The content is expected to be different for partners at the different levels. These particular partner levels are all children of the "partner level" concept 530. Still other children concepts are defined in other embodiments.

Table 14 gives the entries in the relationship type table for the relationship depicted in FIG. 5 by connection 590. Table 15 gives the entries in the participant type table for the relationship depicted in FIG. 5 by connection 590.

TABLE 14

The "Has Info Object" Entries in Relationship Types Table

| Relationship Type Name | Description | Number of Participants | Creation Date |
|---|---|---|---|
| has_info_object | references content | 5 | 4/12/2000 |

TABLE 15

The "Has Info Object" Entries in Participant Types Table

| Relationship Name | Role | Participant Type |
|---|---|---|
| has_info_object | info_object | info_object |
| has_info_object | info_type | info_type |
| has_info_object | concept | Vocabulary |
| has_info_object | job_role | job_role |
| has_info_object | partner_level | partner_level |

The particular instance of the "as info object" relationship depicted in FIG. 5 specifies that a particular information chunk referenced by a particular information object 512 provides an "Introduction" info type about the BetaPerseus 2.0 product of interest to a person playing a marketing role for a silver level partner to the enterprise.

To manage a plurality of information chunks, the IOR-C interface provides methods for defining the information object type, for setting the attributes of a concept of the information object type, for defining the "has info object" relationship type involving the information object type, and for setting the attributes of a particular relationship of the type.

5.3 Method of Managing Information Objects

FIG. 6A is a flow chart illustrating a method 601 for managing an information object repository by generating and storing an information object according to one embodiment.

In step 602, a method of the IOR-C interface receives an information chunk, such as a block of text. In step 604, the information chunk is sent to the content management system (CMS) for storage and a unique identification for the chunk is returned by the CMS to use as a reference for retrieving the information chunk from the CMS. For example, the reference may be the URL of a file in which the information hunk is stored.

In step 606, the method of the IOR-C invokes a method of the concept access API or the concept cache server to instantiate a particular information object of the information object category with a name of the unique reference. A description attribute of the particular information object is set to a text string that describes the information in the information chunk or left blank.

In step 608 the information chunk is associated with a concept in the concept database, an information type, a job role and a partner level. In one embodiment, a user, such as a subject matter expert, is prompted for this information. In another embodiment, the information is provided with the information chunk itself In yet another embodiment this information is derived from information provided with the information chunk or in the information chunk by the content generation application (444 in FIG. 4B). In one embodiment, the description attribute of the particular information object concept is edited to reflect this information.

In step 610 the method of the IOR-C interface invokes a method of the concept access API or the concept cache server to instantiate a particular relationship of the "has info object" relationship type in the concept database (420 in FIG. 4A) of the VDS 410.

Figure 6B:
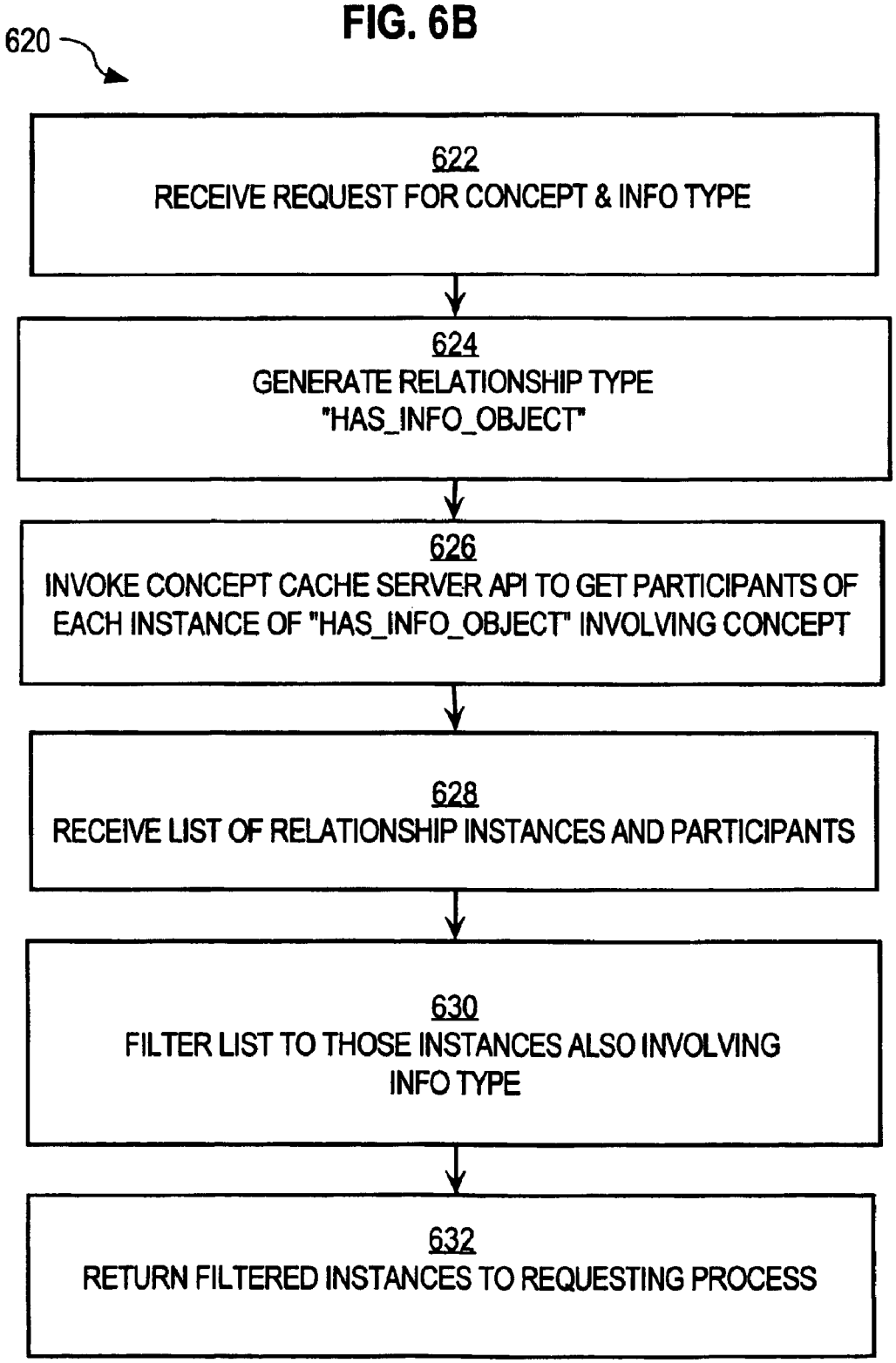
FIG. 6B is a flow chart illustrating a method for managing an information object repository by retrieving an information object according to one embodiment.

FIG. 6B is a flow chart illustrating a method 620 of the IOR-C interface for managing an information object repository by retrieving an information object according to one embodiment.

In step 622 the method receives a request for a particular information type for a particular concept. For example, the request includes data indicating an "Introduction" information type is desired for the "BetaPerseus 2.0" product.

In step 624 the method generates a string naming the relationship type that has an information object as a participant. In this example that string contains the relationship type named "has_info_object."

In step 626 the method of the IOR-C interface invokes a method of the concept access API or the cache server to get participants of each instance of the relationship involving the concept. For example, the method of the IOR-C interface invokes a method named "getParticipants" of the concept access API to get participants of each instance of the "has_info_object" relationship involving the concept "BetaPerseus 2.0." In step 628 the method receives an array of strings giving the relationship instance identification (rID) and the participant concepts in the relationship instance. For example, the array of three instances of the "has_info_object" relationship listed in Table 16 is received.

TABLE 16

Example Instances of "has_info_object" Relationship Returned

| rID | Role | Participant |
|---|---|---|
| 1117 | info_object | ftp://Enterprise.com/literature/devices/Perseus/Intro5.txt/ |
| 1117 | info_type | Introduction |
| 1117 | concept | BetaPerseus 2.0 |
| 1117 | job_role | Technical |
| 1117 | partner_level | Default |
| 4567 | info_object | http://Enterprise.com/datasheets/DS33/ |
| 4567 | info_type | Data Sheet Table |
| 4567 | concept | BetaPerseus 2.0 |
| 4567 | job_role | Default |
| 4567 | partner_level | Default |
| 9877 | info_object | ftp://Enterprise.com/literature/devices/Perseus/Intro27.txt/ |
| 9877 | info_type | Introduction |
| 9877 | concept | BetaPerseus 2.0 |
| 9877 | job_role | Marketing |
| 9877 | partner_level | Silver |

In step 630, this list is filtered to remove those relationships not involving the information type indicated in the request. For example, the relationship instance with rID equal to 4567 is removed because it is not an "Introduction" information type concept specified in the example request. In step 632 the filtered instances of the relationship are returned to the requesting process. For example, the array of Table 16 is returned with the lines for rID of 4567 absent.

FIG. 6C is a flow chart illustrating a method 640 of the IOR-C interface for managing an information object repository by retrieving information content associated with an information object according to one embodiment In step 642 the method receives a request from a user for the information chunk for a particular information type and a particular concept, For example, a user who plays a marketing role with a silver partner requests the information chunk associated with the introduction to the BetaPerseus 2.0 product.

In step 644 the method 640 invokes a method to return the participants in the relationship instances involving an information object concept, the specified concept, and the specified information type concept. As a result, an array of participants for any instances of such a relationship is returned. For example, the method 640 invokes the method 620 to return the participants in the "has_info_object" relationship instances involving the "BetaPerseus 2.0" concept and the "Introduction" information type concept. As a result the array listed in Table 16, excluding the rows with rID of 4567, is returned.

In step 646, the returned array is filtered to remove instances that do not match the user associated with the request. For example, the rows of Table 16 having an rID of 1117, which involve the technical job role, are eliminated because the user associated with the request is a marketing person, not a technical person. Only the rows with an rID of 9877 remain.

In step 648, the references to the information chunks are taken from the particular information object participants in the filtered instances. For example, the URL "ftp://Enterprise.com/literature/devices/Perseus/Intro27.txt/" is obtained from the information object participant in the only remaining relationship instance, the instance having rID 9877.

In step 650, the method of the IOR-C interface requests the information chunk having the reference from the content management system. For example, the IOR-C interface requests from the CMS the information chunk having the URL "ftp://Enterprise.com/literature/devices/Perseus/Intro27.txt/." In step 652, the retrieved information is received and returned to the requesting process.

As described above, the IOR-C interface provides methods for storing information content, for generating and storing an information object associated with the information content, for retrieving an information object, and for retrieving the information content associated with an information object. As described below, other layers of the IOR are generated and used with other interfaces to support fast, dynamic document production based on the concepts and relationships in the vocabulary development server (VDS) and the content in the content management system (CMS).

5.4 Multiple Layer IOR

Figure 7:
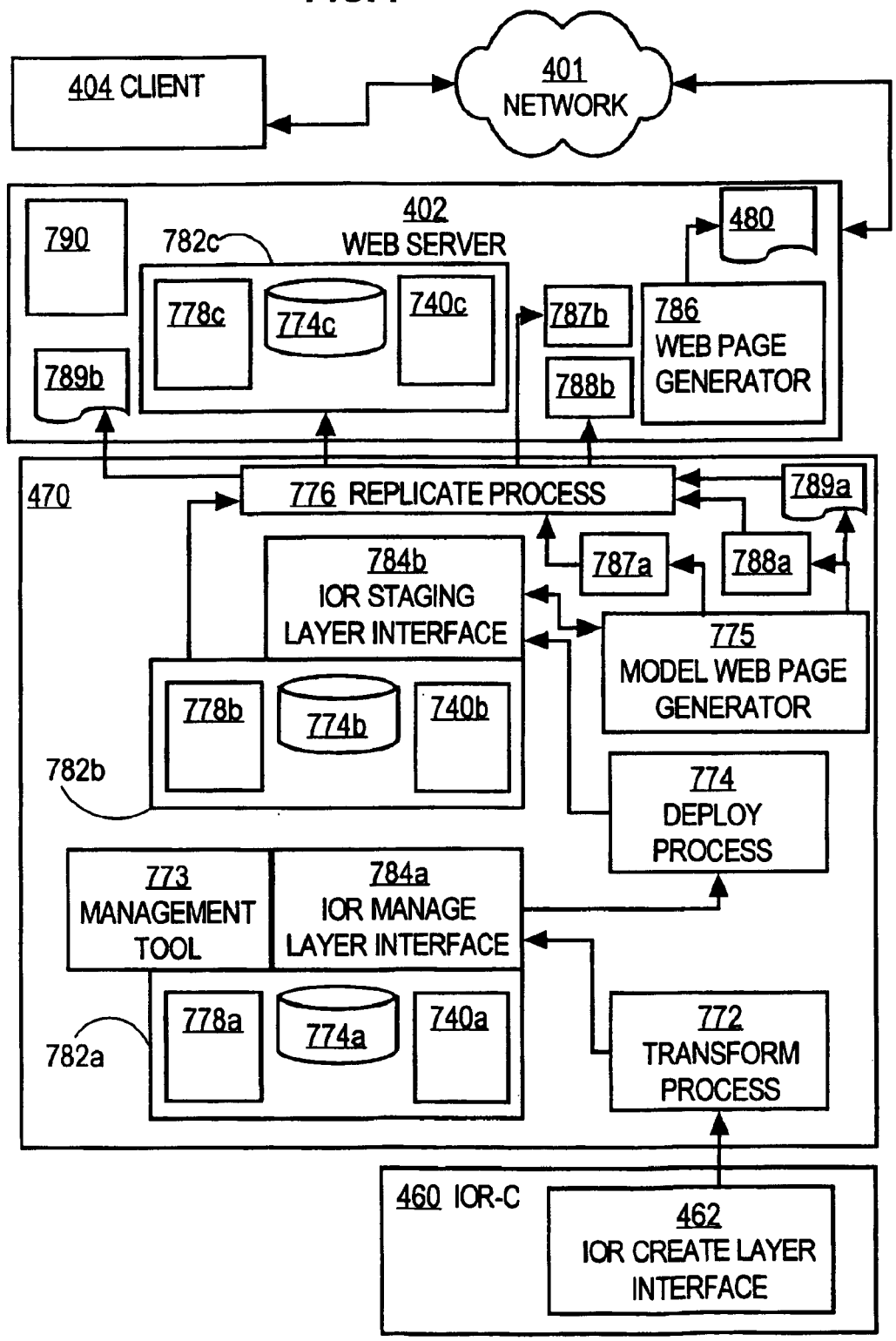
FIG. 7 is a block diagram illustrating a management layer, a staging layer, and a Web server layer of an information object repository according to one embodiment.

FIG. 7 is a block diagram illustrating an information object repository management layer 782*a* (IOR-M), a staging layer 782b (IOR-S), and a Web server layer 782*c* (IOR-F) of a multiple layer information object repository according to one embodiment. Such layers of the IOR are generated and used with IOR layer interfaces 784*a*, 784*b*, to support dynamic electronic document production based on the concepts and relationships in the VDS and the CMS.

Transform process 772 obtains information from the IOR-C layer 460 using the IOR-C layer interface 462 and generates the IOR-M layer 782*a* using the IOR-M layer interface 784*a* The IOR-M layer 782*a* includes a content cache 778*a*, a concept cache 774*a*, and a concept cache server 740*a*. A management layer tool 773 also uses the IOR-M interface 784*a* to allow a user to view and edit the information chunks, concepts and relationships in the IOR-M 782*a*

The content cache is a data store that includes a subset of the information chunks stored in the CMS of the IOR-C layer. Information chunks that have become obsolete or that are not yet released are excluded from the content cache 778*a*. Also excluded are information chunks that are not used by the electronic documents to be produced. Some information chunks of the CMS are combined into a single chunk in the content cache 778*a*, if doing so is expected to enhance efficiency of use. For example, information chunks that are always used together in the documents to be produced may be combined into a single information chunk in the content cache 778*a*.

The concept cache is a data store that includes a subset of the concepts and relationships stored in the concept database. The concept data from the concept database is de-normalized in the concept cache to improve speed of retrieval by allowing a concept that participates in more than one relationship to be stored more than once in the concept cache. For example, an information type concept is stored with other information type concepts in the information type hierarchy and again with each document type that includes the information type. Thus, when a document is generated, a full description of the information types is with the document type, reducing time needed to retrieve such data from the concept cache.

The management layer concept cache server 740*a* provides access to the concepts and relationships in the management layer concept cache 774*a* The cache servers 740 in all the layers support the same methods provided by the concept access API (432 in FIG. 4A), but each cache server 740 operates on the concept cache 774 in the same layer.

The deploy process 774 obtains information from the IOR-M layer 782*a* using the IOR-M layer interface 784*a* and generates the IOR-S layer 782*b* using the IOR-S layer interface 784*b*. The IOR-S layer 782*b* includes a second content cache 778*b*, a second concept cache 774*b*, and a second concept cache server 740*b*. A quality assurance application, such as the model electronic document generator 775, uses the IOR-S interface 784*b* to allow a user to test the IOR-S layer 782*b* for its suitability for generating documents to be provided in a later stage. For example, the IOR-S layer is tested using the IOR-S interface 784*b* to ensure that all information chunks in the content cache have an information object concept in the concept cache and that the information object concept has a relationship with at least an information type concept. As another example, authors use the IOR-S interface 784*b* to view the information chunks and determine that the information is correct for the concepts to which the information chunks are related by a corresponding information object.

A model electronic document generator 775 also uses the IOR-S interface 784*b* to allow a Web site developer to generate, view and edit the electronic documents to be provided by the Web server. In the course of operations the model electronic document generator 775 produces a search index 787*a*, a directory structure 788*a* for storing electronic documents produced, and static electronic documents 789*a* that do not depend on the user profile of the user viewing the page.

The replicate process 776 obtains information from the IOR-S layer 782*b* and reproduces it in a fast, Web server layer, IOR-F, 782*c* on each of one or more Web servers, such as Web server 402. The IOR-F layer 782*c* includes a third content cache 778*c* copied from the second content cache 778*b*, a third concept cache 774*c* copied from the second concept cache 774*b*, and a third concept cache server 740*c*. The search index 787*a*, directory structure 788*a* and static pages 789*a* are also replicated as search index 787*b*, directory structure 788*b* and static pages 789*b*, respectively, on each of the Web servers, such as Web server 402.

An electronic document generator 786 produces electronic documents 480 in response to requests from client 404. The electronic document generator 786 uses the search index 787*b*, the directory structure 788*b*, the static pages 789*b*, and the IOR-F layer 782*c* in any combination to produce the electronic documents 480. As described in more detail in the next section, when a user selects a concept with content that depends on the user profile, the electronic document generator uses the concept cache server 740*c* to determine information types in the electronic document type, and the information objects related to the information types for the selected concept. The electronic document generator then retrieves the information chunks from the content cache using the URL reference from the information object.

Also shown on Web server 402 is a web application 790 that may be requested through the electronic documents 480.

In the following sections, the use of the IOR-F layer is first described to illustrate the dynamic document production to be supported by the multiple layer IOR. Then the use of the IOR-M and IOR-S layers are described to show how those layers support the formation of the IOR-F layer.

5.5 IOR Web Server Layer (Fast Layer)

FIG. 8A is a flow chart illustrating a method 810 for generating a static electronic document based on the IOR-F layer 782c according to one embodiment.

In step 812, a user profile is obtained, such as when a client 404 operated by a user contacts the Web server 402 and logs on. A default user profile is used if the Web server does not require or provide a user log-in process. A list of concept categories available through the site is presented on a static electronic document returned to the client The static electronic document is found using the directory structure 788b of the Web server 402.

FIG. 8B is a flow chart illustrating a method 820 for generating a concept home electronic document based on the IOR-F layer according to one embodiment.

In step 822 data is received from the client process indicating a concept selected by the user. The concept selected is the concept whose home electronic document is to be produced. For example, the data may indicate the user has selected a Product root concept so that a Product root concept home Web page is to be produced. In an alternative example, the data may indicate the user has selected the BetaPerseus 2.0 concept so that a BetaPerseus 2.0 home Web page is to be produced. In one embodiment, the electronic document generator finds the information types that constitute a concept home page document from the concept cache server and finds that it includes five information types, as listed above; namely, a "Product Name Heading" information type in a first position, an "Introduction" information type in a second position, a "List of Other Info Types for Concept" information type in a third position, a "List of Other Documents for Concept" information type in a fourth position, and a "List of Next Concepts in Hierarchy" information type in the fifth position.

In step 824, the information chunks for the page are retrieved. For example, the information chunk associated with the "Introduction" information type for the BetaPerseus 2.0 concept for the job role and partner level in the user profile of the user is retrieved. In one embodiment the method 640 illustrated in FIG. 6C is invoked from the concept cache server 740c in the IOR-F layer.

In another embodiment, the concept cache server 740c determines the information object related to the concept, information type and user and returns the URL of the information chunk from the information object, and the electronic document generator retrieves the information chunk based on the URL returned. For example the concept cache server 740c returns the URL "ftp://Enterprise.com/literature/devices/Perseus/Intro27.txt/" and the electronic document generator retrieve the information chunk stored at that URL.

In the example embodiment, the Product Name Heading information type is based on the concept name and does not require an information chunk be retrieved. Similarly, the list of other information types and other documents for the concept and user depend on information in the concept cache and also do not require an information chunk be received.

In step 826 the other information types for this concept that have information objects are retrieved from the concept cache server 740c based on the concept cache 774c to supply the list of other information types for the electronic document. The user may later be allowed to retrieve any of the information chunks for the information types listed on this page. For example, the other information types that have information objects for BetaPerseus 2.0 for the silver partner marketing user are returned, such as a "Data Sheet Table" and a "Features and Benefits" information type. If an information object is not related to an information type, that information type is not listed. For example, if a "Product Photo" is not available for this product for this user, then the "Product Photo" is not included in the list of available information types.

In step 828 the other document types for this concept that have information objects are retrieved from the concept cache server 740c based on the concept cache 774c to supply the list of other documents for the electronic document. The user may later be allowed to retrieve any of the documents listed on this page. For example, the other document types that have information objects for BetaPerseus 2.0 for the silver partner marketing user are returned, such as a "Data Sheet" and a "Marketing Document" document type. If an information object is not related to every information type of a document type, that document type is not listed. For example, if a "Press Release" is not available for this product for this user, then the "Press Release" is not included in the list of available document types.

In step 830 an electronic document 480 is generated for the concept home electronic document and sent to the client 404. This step includes finding the next concepts in the hierarchy by requesting them from the concept cache server. The concept home electronic document comprises a concept name as a title, information from the information chunk associated with the "Introduction" information type, a selectable list of other information types, a selectable list of other document types, and a selectable list of the next concepts in the hierarchy. For example, the BetaPerseus 2.0 home electronic document includes the title "BetaPerseus 2.0", the Introduction information chunk stored in URL "ftp://Enterprise.com/literature/devices/Perseus/Intro27.txt/", a list of other available info types including "Data Sheet Table" and "Features and Benefits," a list of available document types including "Data Sheet" and "Marketing Document," and a list of the next concepts in the Product hierarchy, "BetaPerseus 2.4" and "BetaPerseus 3.0."

FIG. 8C is a flow chart illustrating a method 840 for generating an information type electronic document for a concept based on the IOR-F layer according to one embodiment This method is invoked, for example, if the user selects the "Features and Benefits" information type on the BetaPerseus 2.0 home Web page.

In step 842, the method receives data indicating a user selection of a particular information type for the concept. In step 844, the method uses the concept cache server to find the information object related to the concept, user, and information type. The concept server cache returns the information object identified by the unique URL reference to the information chunk in the content cache. For example, the concept cache server is used to find the information object related to a "Features & Benefits" information type for the "BetaPerseus 2.0" concept for a marketing role person of a silver partner. The concept server cache returns an information object identified by the URL, such as "ftp://Enterprise.com/marketing/FandB44.txt/", the unique reference to the information chunk in the content cache.

In step 846, the URL returned to the electronic document generator is used to retrieve the information chunk. For example, the information chunk in "ftp://Enterprise.com/marketing/FandB44.txt/" is retrieved. In step 848, an electronic document is generated that includes the information chunk, and the electronic document is sent to the client process. For example an electronic document 480 showing the features and benefits of the BetaPerseus 2.0 of interest to a marketing person of a silver partner is produced and sent to client 404.

FIG. 8D is a flow chart illustrating a method 860 for generating a concept document electronic document based on the IOR-F layer according to one embodiment. This method is invoked, for example, if the user selects the "Data Sheet" document type on the BetaPerseus 2.0 home Web page.

In step 862, the method receives data indicating a user selection of a particular document type for the concept. In step 864 the method uses the concept cache server to find the information types included in this document type. For example, the Data Sheet document type includes the "Introduction" information type and the "Data Sheet Table" information type. In step 866, the method uses the concept cache server to find the information objects related to the concept, user, and information types. The concept server cache returns the information objects identified by the unique URL references to the information chunks in the content cache. For example, the concept cache server is used to find the information objects related to an "Introduction" information type and a "Data Sheet Table" information type for the "BetaPerseus 2.0" concept for a marketing role person of a silver partner. If a information object is not available for the specific role or partner a default role or partner or both is used in this embodiment. The concept server cache returns information objects identified by their URLs, such as "ftp://Enterprise.com/literature/devices/Perseus/Intro25.txt/" and "http://Enterprise.com/datasheets/DS33P", the unique references to the information chunks in the content cache.

In step 868, the URLs returned to the electronic document generator are used to retrieve the information chunks. For example, the information chunks in "ftp://Enterprise.com/literature(devices/Perseus/Intro25.txt/" and "http://Enterprise.com/datasheets/DS33" are retrieved. In step 870, an electronic document representing the document is generated that includes the information chunks, and the electronic document is sent to the client process. For example a Data Sheet electronic document showing the Introduction for the BetaPerseus 2.0 and a Data Sheet Table for the BetaPerseus 2.0 of interest to a marketing person of a silver partner is produced and sent to client 404

FIG. 8E is a flow chart illustrating a method 880 for generating a concept search result electronic document based on IOR-F layer according to one embodiment. This method is invoked, for example, if the user inputs a key word into a "search" field on the static home page.

In step 882, the method receives the search term from a particular user having a user profile, such as a visitor profile. In step 884, the electronic document generator uses the search index 787*b* to find the search term. The index 787*b* provides a list of information objects in the concept cache for each term. Use of index 787*b* is one option to translate a search query that may have alternative forms. Alternatively, such translation may occur through one or more programmatic function calls to methods of an application programming interface. In step 886, if the search term is found in the index, then the information objects listed for the found term are retrieved by the electronic document generator.

In step 888, the concept cache server is used to determine the concepts and users related to the found information objects, and the information objects are filtered to remove the information objects related to users that do not match the user profile of the user requesting the search. In this context, an information object for a default job role or default partner match the role and partner, respectively, of the user making the request.

In step 890, the electronic document generator produces an electronic document displaying the search term and listing the concepts related to the filtered information objects, and for each concept lists the names of the filtered information objects related to the concept. In an alternative embodiment, the information types related to the filtered information objects are listed in lieu of or along with the names of the filtered information objects.

For example, a search on the term "SuperPerseus" may find the term in the index along with a particular information object associated with the information chunk containing the section of the article that coined the term. If the particular information object were generated and related to users in default job roles and default partner levels in the IOR-C level, then the electronic document produced would display the search term "SuperPerseus" and display the concept "BetaPerseus 2.5" and list the information object, such as "http://TechJournal.com/V9/Issue11/article2/", and an information type, such as "External Article Section."

FIG. 8F is a flow chart illustrating a method 891 for generating an information chunk electronic document based on the IOR-F layer according to one embodiment. This method is invoked, for example, if the user selects the "http://TechJournal.com/V9/Issue11/article2/" information object on the search results electronic document.

In step 892, the electronic document generator receives data from the client 404 indicating the user's selection of a particular information object. In step 894, the electronic document generator retrieves the information chunk stored in the content cache at the URL address of the information object. In step 896, the electronic document generator produces an electronic document displaying a concept name, an information type name, and the information chunk and sends the electronic document to the client process 404 for display to the user. This step may include retrieving the concept and information type related to the information object from the concept cache server. For example, if the user selects the "http://TechJournal.com/V9/Issue11/article2/" information object on the search results electronic document, the user is then presented with an electronic document showing "BetaPerseus 2.5" "External Article Section" and one or more formatted paragraphs from the article coining the phrase "SuperPerseus."

Using the IOR-F layer, an electronic document generator can produce dynamic electronic documents tailored to a particular user based on content in the content cache, arranging the content on the electronic document based at least in part on data in the concept cache.

5.6 IOR Management Layer

Figure 9A:
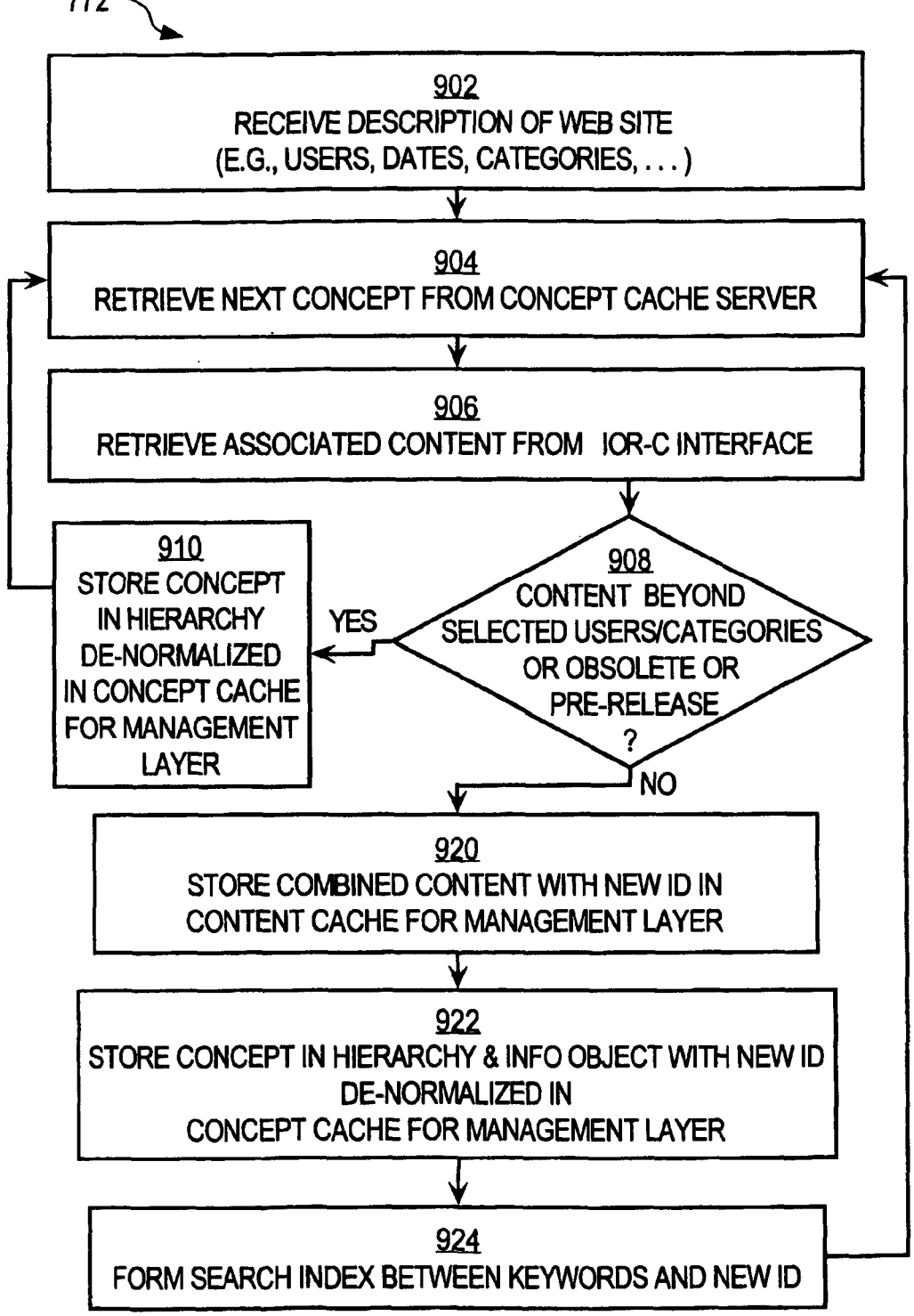
FIG. 9A is a flow chart illustrating a method for generating and managing a management layer of the information object repository according to one embodiment.

FIG. 9A is a flow chart illustrating an embodiment 772' of a method for generating and managing the IOR-M layer. In the embodiment described, these steps are performed by an embodiment of the transform process 772 depicted in FIG. 7. In other embodiments, some of these steps are performed by a user or application invoking the management tool 773 in FIG. 7.

In step 902, data indicating a range of users, dates and categories of concepts are received that help determine which documents are to be generated in the IOR-F layer. For example, the data received may indicate that only documents about products and services will be produced in the IOR-F layer, not documents about research projects or joint ventures. This information helps determine the subset of concepts and content to be moved to the management layer.

In step 904, the next concept is retrieved from the IOR-C layer interface 462, which invokes a method of the concept access API (432 in FIG. 4B) or the concept cache server (440 in FIG. 4B). In the alternative embodiment shown, the transform process accesses the concept cache server 440 directly rather than through the IOR-C layer interface 462. In an embodiment using the management tool 773 the next concept is retrieved by invoking a method of the IOR-M layer interface 784a. The first time step 904 is performed a first concept retrieved from the IOR-C layer interface is the "next" concept.

In step 906, the information chunks associated with the concept are retrieved from the IOR-C layer interface 462. In one embodiment this involves invoking a method of interface 462 that returns all the participants in a "has_info_object" relationship with the concept. Then, the unique reference in each info object participant is used to retrieve the associated information chunk.

Step 908 represents a branch point at which it is determined whether the information chunk is beyond the range of users, dates and categories of concepts that are the topics for the documents to be produced in the IOR-F layer. Step 908 also represents the branch point for determining whether the information chunk is obsolete or not yet released for distribution in documents to users. If all the information chunks are beyond the range or obsolete or pre-release, then control passes to step 910. Otherwise control passes to step 920.

In step 910 the concept is added to the management layer concept cache 774a as part of a hierarchy of concepts in a denormalized mode, such as by repeating the same concept for each relationship that involves the concept. Control then passes back to step 904 to process the next concept.

In step 920, the subset of information chunks that are not out of range or obsolete or pre-release are added to the management layer content cache 778a. The position of the information chunk is likely changed; therefore the reference that uniquely identifies the chunk for retrieval has likely changed also. In some cases two or more information chunks from the IOR-C layer are combined into a single information chunk for the management layer content cache. Each information chunk of the subset is stored with its new references, e.g. its new ID, in the content cache.

In step 922, the concept is added to the management layer concept cache 774a as part of a hierarchy of concepts in a denormalized mode. An information object concept is added using the new ID as a new reference. One or more relationships involving the information object and another concept are also added to the management layer concept cache.

In step 924 a search index is generated with a variety of terms from the information chunk. For each term in the information object a term is found in the index, or added to the index if not already there. Then the name of the information object is added to a list of information objects for the found term, or starts the list of information objects for the added term. In many embodiments, the information object name is the unique reference to the associated information chunk. In other embodiments, the search index is not generated in the transform process 772 but is performed using the management tool 773. In still other embodiments, the search index is not generated in the IOR-M layer, but instead in the IOR-S layer.

After step 924, control passes back to step 904 to retrieve the next concept.

Using these techniques, streamlined subsets of the information chunks in the CMS and the concepts and relationships in the concept database of the VDS are formed and managed, including being viewed and edited, to expedite the dynamic production of documents.

5.7 IOR Staging Layer

FIG. 9B is a flow chart illustrating an embodiment 774' of a deploy method for generating and managing the IOR-S layer 782b. In step 944 the next concept is retrieved from the management layer concept cache server 740a using the IOR-M layer interface 784a At the start of the process, the first concept retrieved is the next concept. When no concepts remain to be the next concept, the process terminates. In step 946 the associated information chunk is retrieved from the management layer content cache 778a through the IOR-M layer interface 784a. This step invokes a method that retrieves the information objects related to the concept in a "has_info_object" relationship and uses the unique references in the information objects to retrieve the information chunks.

In step 948 the information chunk is stored using the IOR-S layer interface in the staging area content cache 778b with a new unique reference in the form of a relative URL in a directory structure. In other embodiments, the URL is an absolute URL address for the intended storage when replicated to a IOR-Fast layer on one or more Web servers. In still other embodiments, the relative URL is assigned in a separate process, such as the model electronic document generator process 775, after the information chunks are stored in the IOR-S layer 782b. In step 950, the current concept is stored in its concept hierarchy in the staging layer concept cache 774b and the information object with the new reference is also stored in the staging layer concept cache 774b using the IOR-S layer interface 784b.

If a search index was generated with the data in the management layer, that index is also copied in step 952, changing the information object name to reflect the new unique reference, such as the new information chunk ID, in some circumstances.

FIG. 9C is a flow chart illustrating an embodiment 775' of a method for preparing a Web site based on the IOR-S layer 782b. For purposes of illustrating a simple example, FIG. 9C is described herein in the context of preparing a Web site. However, the processes described herein are equally applicable to managing other information, e.g., sets of electronic documents relating to mobile services, Web services, print documents, etc.

In step 962 a model electronic document generating process generates and previews Web pages for the Web site, including forming a directory structure 788a that can be replicated to each of the Web servers that host the Web site, and a search index 787a, if one has not yet been formed. The content for these model pages are obtained from the IOR-S layer using the IOR-S layer interface 784b for modifying the content and concept caches, and using the concept cache server to retrieve the relationships and concepts that define documents and that point to the information chunks in the content cache.

In step 964, static pages 789a for the Web site are generated. The static pages do not depend on the user profile of the user operating the client process 404 requesting the page. The content for these model pages are obtained from the IOR-S layer using the IOR-S layer interface 784b for modifying the content and concept caches, and using the concept cache server to retrieve the relationships and concepts that define documents and that point to the information chunks in the content cache.

In step 966, the IOR-S layer interface is used to determine that every information chunk in the content cache has an information object in the concept cache and is related to at least one other concept in the concept cache. An information chunk can be orphaned, e.g., left without an information object and relationship, if a concept or information object is deleted from the concept cache. If orphaned, an information object referencing the chunk and at least one relationship to another concept are added to the concept cache using the IOR-S layer interface.

In step 968, information chunks are viewed by authors or experts and invalidated if incorrect or insufficient for the information type, concept or user to which they are related, using the IOR-S layer interface. Information objects may be edited using the IOR-C layer interface in response to receiving an alert message to correct an invalidated information object.

In step 970, the computational resources employed to dynamically generate Web pages for the Web site are measured to determine if a new arrangement of concepts in the concept cache or information chunks in the content cache is worthwhile.

In step 972, the index entries in the search index are tested for currency and edited by authors or experts if no longer deemed appropriate for the edited content cache or concept cache.

Using these techniques, the content cache, concept cache, search index, directory structure, and static pages are formed, reviewed and honed in the IOR-S layer for supporting the correct, rapid, and dynamic production of Web page based documents. Once generated, reviewed, and edited as deemed fitting, the content cache, the concept cache, and the concept cache server, the static pages, the search index, and the directory structure of files are replicated to one or more Web servers, as indicated in FIG. 7 by the replicate process 776. These replicated structures provide content and functionality to a Web page generating process installed on each of the one or more Web servers. The content cache, the concept cache, and the concept cache server constitute the IOR Web server layer, i.e., the IOR fast layer, IOR-F, 782*c*. The content cache provides content to the Web page generating process. The concept cache and concept cache server provide the arrangement of the content to the Web page generating process. The number and location of Web servers are determined by load balancing considerations using any method known in the art at the time of the replication.

6.0 Hardware Overview

Figure 10:
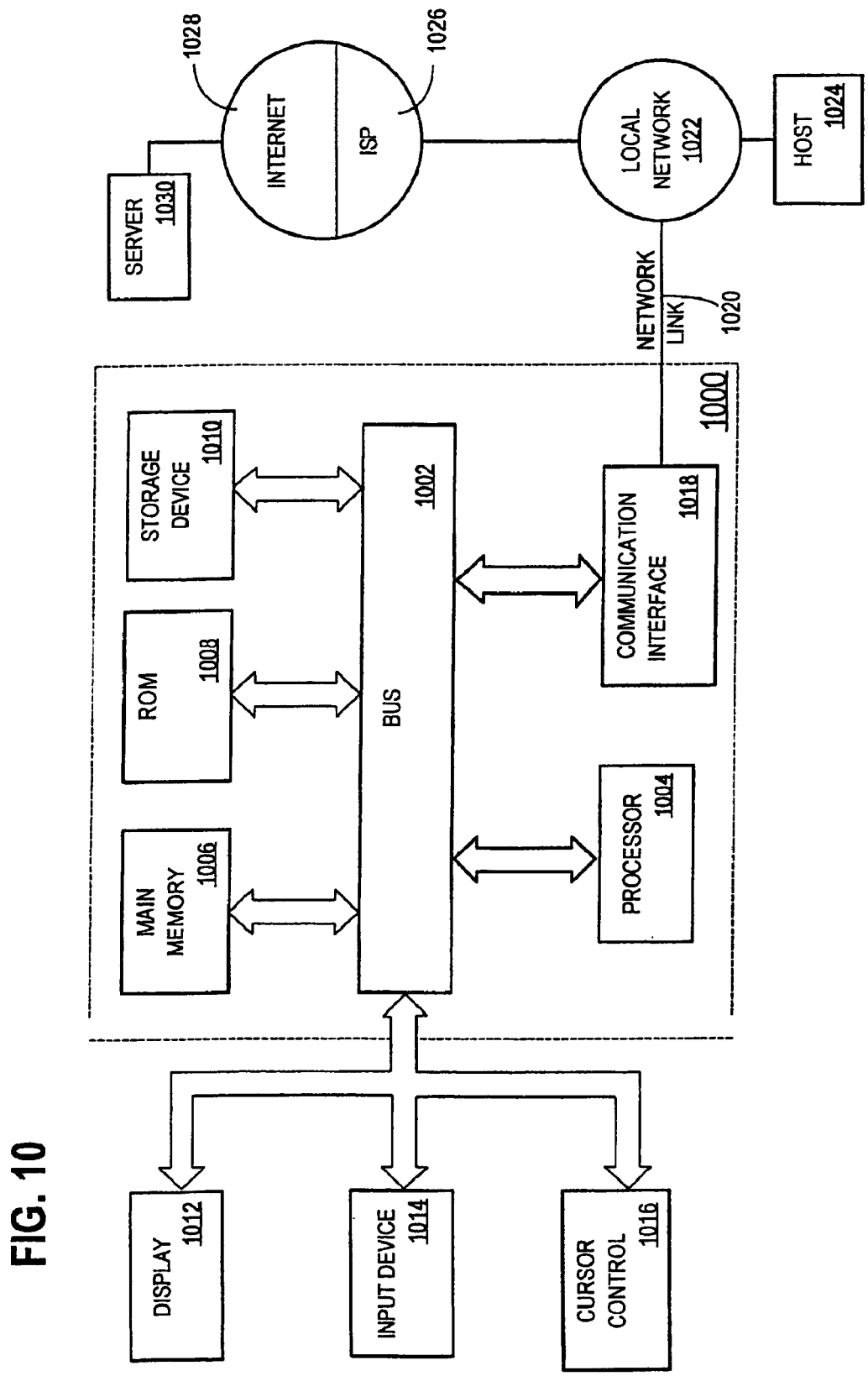
FIG. 10 is a block diagram that illustrates a computer system upon which an embodiment may be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory ("RAM") or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory ("ROM") 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 maybe coupled via bus 1002 to a display 1012, such as a cathode ray tube ("CRT"), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for a vocabulary development server and information object repository. According to one embodiment of the invention, a vocabulary development server is provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network ("ISDN") card or a modem to provide a data communication connection to a corresponding type of telephone line. As another example, communication interface 1018 maybe a local area network ("LAN") card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider ("ISP") 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for an information object repository API as described herein.

The received code may be executed by processor 1004 as it is received, and/or stored in storage device 1010, or other non-volatile storage for later execution. In this manner, computer system 1000 may obtain application code in the form of a carrier wave.

7.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of relating data stored in one or more content management systems for an enterprise, the method comprising the steps of:
   managing a first information object data structure corresponding to a first information object, wherein the first information object is data stored in a file;
   managing a first concept data structure corresponding to a first concept;
   managing a second concept data structure corresponding to a second concept;
   managing a first relationship data structure, wherein the first relationship data structure comprises a first reference to the first concept data structure and a second reference to the second concept data structure;
   managing a second relationship data structure, wherein the second relationship data structure comprises a third reference to the first concept data structure and a fourth reference to the first information object data structure;
   receiving a request for a document referring to the second concept; and
   generating the document referring to the second concept based on a set of information, wherein the set of information comprises the first relationship data structure, the second relationship data structure, the first information object data structure, and the first information object.

2. The method of claim 1, wherein the second concept is different than the first concept.

3. The method of claim 1, wherein the first relationship data structure further comprises a reference to a third concept data structure.

4. The method of claim 1, wherein the second relationship data structure corresponds to a child-of relationship type; wherein the first concept and second concept are each one of a set of atomic concepts; a hierarchy is a subset of the set of atomic concepts related by a series of one or more relationships of the child-of relationship type to a root concept of the set of atomic concepts; and the first concept belongs to a particular hierarchy having a particular root concept.

5. The method of claim 4, wherein the particular root concept is one of an information type root concept, a document type root concept, a product type root concept, a technology type root concept, a solution type root concept, and a user type root concept.

6. The method of claim 5, wherein the second concept belongs to a second hierarchy having a second root concept, wherein the second root concept is different from the particular root concept.

7. The method of claim 1, wherein the first information object is one of a block of text, an application, a query for a database, a vector graphic, an image, audio data, and video data.

8. The method of claim 1, wherein the fourth reference comprises one of a file name, a network resource address, a universal resource locator (URL) address, a record identification in a predetermined database, a record identification in a predetermined content management system.

9. The method of claim 1, wherein the first information object is one of a plurality of information objects; the plurality of information objects reside in a plurality of content management systems; and said step of managing the plurality of information objects further comprises employing a data integration tool to retrieve the first information object from a content management system that resides on a remote platform accessible through a network.

10. The method of claim 1, further comprising the step of storing the first information object into a content cache based at least in part on data in the second relationship data structure.

11. The method of claim 10, wherein the first concept data structure and the second concept data structure are stored in a vocabulary database; and wherein the method further comprises the step of generating and storing a subset of the vocabulary database into a concept cache based at least in part on data in the second relationship data structure.

12. The method of claim 11, wherein the set of information comprises the concept cache and the content cache.

13. The method of claim 12, wherein the document is organized based at least in part on the second relationship data structure.

14. The method of claim 12, wherein the document displays information based on at least one information object in the content cache.

15. The method of claim 11, further comprising the step of editing at least one of the concept cache and the content cache.

16. The method of claim 10, further comprising step of generating and storing a plurality of information objects, said step of generating and storing the plurality of information objects further comprising combining at least two information objects of the plurality of information objects into a single information object in the content cache.

17. The method of claim 16, wherein a second information object corresponds to a second information object data structure, and a third relationship data structure comprises references to the second information object data structure and the second concept data structure.

18. The method of claim 11, said step of generating and storing the subset of the vocabulary database into the concept cache further comprising de-normalizing the concept cache to improve speed of retrieval by allowing a concept data structure for a concept that participates in more than one relationship to be stored more than once in the concept cache.

19. The method of claim 1, further comprising employing a first set of software tools including at least one tool for defining a type instance for the first information object data structure and a tool for defining a type and instance for the first relationship data structure.

20. The method of claim 1, further comprising the steps of generating and storing a first subset of a plurality of information objects into a first content cache for managing content of a Web page.

21. The method of claim 20, further comprising the step of managing the first subset by employing a second set of software tools including at least one of: a tool for editing the first information object data structure, a tool for editing the first relationship data structure, a tool for populating the first content cache, a tool for populating a first concept cache, a tool for retrieving from the first content cache, a tool for combining two or more information objects into a new information object, and a tool for de-normalizing the first concept cache to improve speed of retrieval by allowing a concept data structure for a concept that participates in more than one relationship to be stored more than once in the first concept cache.

22. The method of claim 20, wherein the first subset of the plurality of information objects excludes information objects that have become obsolete.

23. The method of claim 20, wherein the first subset of the plurality of information objects excludes information objects that have not been released.

24. The method of claim 20, further comprising the steps of generating and storing a second subset of the first content cache into a second content cache for staging content for the Web page.

25. The method of claim 24, further comprising the step of replicating the second content cache to one or more Web servers for providing content to a Web page generating process on each of the one or more Web servers.

26. The method of claim 24, further comprising the step of managing the second subset by employing a third set of software tools including at least one of: a tool for editing the first information object data structure, a tool for populating the second content cache, a tool for populating a second concept cache, a tool for ensuring each information object in the second content cache has an information object data structure and a relationship to another concept in the second concept cache, and a tool for forming a search index for the second content cache.

27. The method of claim 1, further comprising the step of: arranging content in the document based at least in part on the second relationship data structure.

28. A computer-readable medium carrying one or more sequences of instructions for relating data stored in one or more content management systems for an enterprise, which instructions, when executed by one or more processors, cause the one or more processors to carry out the steps of:
managing a first information object data structure corresponding to a first information object;
managing a first concept data structure corresponding to a first concept;
managing a second concept data structure corresponding to a second concept; the first
managing a first relationship data structure, wherein the first relationship data structure comprises a first reference to the first concept data structure and a second reference to the second concept data structure;
managing a second relationship data structure, wherein the second relationship data structure comprises a third reference to the first concept data structure and a fourth reference to the first information object data structure;
receiving a request for a document referring to the second concept; and
generating the document referring to the second concept based on a set of information, wherein the set of information comprises the first relationship data structure, the second relationship data structure, the first information object data structure, and the first information object.

29. The computer-readable medium of claim 28, further comprising one or more sequences of instructions for relating data stored in one or more content management systems for the enterprise, which instructions, when executed by one or more processors, cause the one or more processors to carry out the steps of;
arranging content in the document based at least in part on the second relationship data structure.

30. A system for relating data stored in one or more content management systems for an enterprise, comprising:
means for managing a first information object data structure corresponding to a first information object;
means for managing a first concept data structure corresponding to a first concept;
means for managing a second concept data structure corresponding to a second concept;
means for managing a first relationship data structure, wherein the first relationship data structure comprises a first reference to the first concept data structure and a second reference to the second concept data structure;
means for managing a second relationship data structure, wherein the second relationship data structure comprises a third reference to the first concept data structure and a fourth reference to the first information object data structure;
means for receiving a request for a document referring to the second concept; and
means for generating the document referring to the second concept based on a set of information, wherein the set of information comprises the first relationship data structure, the second relationship data structure, the first information object data structure, and the first information object.

31. The system of claim 30, further comprising:
means for arranging content in the document based at least in part on the second relationship data structure.

32. A computer system for relating data stored in one or more content management systems for an enterprise, the computer system comprising:

one or more computer-readable mediums carrying one or more executable sequences of instructions for managing a first information object data structure corresponding to a first information object;

for managing a first concept data structure corresponding to a first concept;

for managing a second concept data structure corresponding to a second concept;

for managing a first relationship data structure, wherein the first relationship data structure comprises a first reference to the first concept data structure and a second reference to the second concept data structure;

for managing a second relationship data structure, wherein the second relationship data structure comprises a third reference to the first concept data structure and a fourth reference to the first information object data structure; and one or more processors configured for receiving a request for a document referring to the second concept; and for generating the document referring to the second concept based on a set of information, wherein the set of information comprises the first relationship data structure, the second relationship data structure, the first information object data structure, and the first information object.

33. The computer system of claim 32, further comprising:

one or more processors configured for arranging content in the document based at least in part on the second relationship data structure.

\* \* \* \* \*

UNITED STATES PATENT AND TRADEMARK OFFICE
CERTIFICATE OF CORRECTION

PATENT NO. : 6,983,288 B1
DATED : January 3, 2006
INVENTOR(S) : Michael J. Kirkwood et al.

It is certified that error appears in the above-identified patent and that said Letters Patent is hereby corrected as shown below:

Column 48,
Line 11, delete "the first".

Signed and Sealed this

Thirteenth Day of June, 2006

JON W. DUDAS
*Director of the United States Patent and Trademark Office*